(12) United States Patent
Clark

(10) Patent No.: US 11,703,560 B2
(45) Date of Patent: *Jul. 18, 2023

(54) MARINE CHART AND SONAR IMAGE PRESENTATION SYSTEMS AND METHODS

(71) Applicant: NAVICO, INC., Tulsa, OK (US)

(72) Inventor: Jeremiah D. Clark, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,135

(22) Filed: Oct. 13, 2022

(65) Prior Publication Data
US 2023/0038251 A1    Feb. 9, 2023

Related U.S. Application Data

(63) Continuation of application No. 17/174,415, filed on Feb. 12, 2021, now Pat. No. 11,500,054, which is a (Continued)

(51) Int. Cl.
*G01S 3/801* (2006.01)
*G01S 3/802* (2006.01)
(Continued)

(52) U.S. Cl.
CPC .............. *G01S 3/801* (2013.01); *G01S 3/802* (2013.01); *G06F 3/0412* (2013.01);
(Continued)

(58) Field of Classification Search
CPC ........ G01S 3/801; G01S 3/802; G06F 3/0412; G06F 3/04845; G06F 3/0488; G09B 29/003; H04N 1/00411
See application file for complete search history.

(56) References Cited

U.S. PATENT DOCUMENTS

| 4,425,635 A | 1/1984 | Yamamoto et al. |
| 6,520,105 B2 | 2/2003 | Koda et al. |

(Continued)

FOREIGN PATENT DOCUMENTS

| AU | 2019203322 A1 | 12/2019 | |
| AU | 2022200706 A1 * | 9/2022 | ............. G01S 3/801 |

(Continued)

OTHER PUBLICATIONS

"Teledyne SeaBotix—SmartFlight 2.0"; YouTube; Apr. 13, 2018; retrieved from https://www.youtube.com/watch?v=xFJ2OCKIXwc.
(Continued)

*Primary Examiner* — Daniel Pihulic
(74) *Attorney, Agent, or Firm* — Nelson Mullins Riley & Scarborough LLP

(57) ABSTRACT

Systems and methods for presenting marine information are provided herein. A system includes an array of a plurality of sonar transducer elements associated with a watercraft and a display. The system causes presentation of a chart of a body of water, including a representation of the watercraft at a current location. The system also operates the array to cause transmission of sonar beams into the underwater environment and receives sonar return data from the array. The system further generates, based on the sonar return data, a two-dimensional live sonar image, determines a facing direction of the array, and causes presentation of the sonar image in the facing direction on the chart and relative to the representation of the watercraft. Accordingly, live sonar imagery is presented on the chart to visually provide a relationship between objects within the live sonar imagery and the real-world position of those objects.

20 Claims, 22 Drawing Sheets

Related U.S. Application Data continuation-in-part of application No. 17/123,189, filed on Dec. 16, 2020, now Pat. No. 11,435,427, which is a continuation of application No. 15/982,362, filed on May 17, 2018, now Pat. No. 10,914,810.

(51) Int. Cl.

| | | |
|---|---|---|
| *G06F 3/041* | (2006.01) | |
| *H04N 1/00* | (2006.01) | |
| *G06F 3/0488* | (2022.01) | |
| *G09B 29/00* | (2006.01) | |
| *G06F 3/04845* | (2022.01) | |

(52) U.S. Cl.
CPC ........ *G06F 3/0488* (2013.01); *G06F 3/04845* (2013.01); *G09B 29/003* (2013.01); *H04N 1/00411* (2013.01)

(56) References Cited

U.S. PATENT DOCUMENTS

| | | | |
|---|---|---|---|
| 7,355,924 B2 | 4/2008 | Zimmerman et al. | |
| 7,606,114 B2 | 10/2009 | Bachelor et al. | |
| 8,645,012 B2 | 2/2014 | Salmon et al. | |
| 8,761,976 B2 | 6/2014 | Salmon et al. | |
| 9,132,900 B2 | 9/2015 | Salmon et al. | |
| 9,135,731 B2 | 9/2015 | Lauenstein et al. | |
| 9,739,884 B2 | 8/2017 | Proctor et al. | |
| 9,784,832 B2 | 10/2017 | Proctor et al. | |
| 9,840,312 B1 | 12/2017 | Clark | |
| 10,012,731 B2 | 7/2018 | Pelin et al. | |
| 10,019,002 B2 | 7/2018 | Harnett et al. | |
| 10,247,832 B2 | 4/2019 | Serafino et al. | |
| 10,365,366 B2 | 7/2019 | Lauenstein | |
| 10,545,235 B2 | 1/2020 | Pelin et al. | |
| 10,914,810 B2 * | 2/2021 | Laster | G01S 7/6272 |
| 11,435,427 B2 * | 9/2022 | Laster | G01S 15/8902 |
| 11,500,054 B2 * | 11/2022 | Clark | G09B 29/003 |
| 2008/0130413 A1 | 6/2008 | Bachelor et al. | |
| 2009/0037040 A1 | 2/2009 | Salmon et al. | |
| 2014/0013270 A1 | 1/2014 | Thomas et al. | |
| 2014/0013276 A1 | 1/2014 | Butterworth | |
| 2014/0071059 A1 | 3/2014 | Girault | |
| 2014/0096060 A1 | 4/2014 | Thomas et al. | |
| 2014/0336854 A1 | 11/2014 | Salmon et al. | |
| 2015/0142211 A1 | 5/2015 | Shehata et al. | |
| 2016/0054733 A1 | 2/2016 | Hollida et al. | |
| 2016/0061951 A1 | 3/2016 | Brown et al. | |
| 2016/0214715 A1 | 7/2016 | Meffert | |
| 2016/0259049 A1 | 9/2016 | Proctor et al. | |
| 2016/0259050 A1 | 9/2016 | Proctor et al. | |
| 2016/0259051 A1 | 9/2016 | Proctor et al. | |
| 2016/0259052 A1 | 9/2016 | Kirmani et al. | |
| 2016/0306040 A1 | 10/2016 | Hunt et al. | |
| 2016/0341827 A1 | 11/2016 | Homer et al. | |
| 2017/0235308 A1 | 8/2017 | Gordon et al. | |
| 2017/0242113 A1 | 8/2017 | Lauenstein | |
| 2017/0363739 A1 | 12/2017 | Lauenstein | |
| 2018/0100922 A1 | 4/2018 | Wigh et al. | |
| 2018/0107210 A1 | 4/2018 | Harnett et al. | |
| 2018/0288990 A1 | 10/2018 | Laster et al. | |
| 2019/0353744 A1 | 11/2019 | Laster et al. | |
| 2020/0241133 A1 | 7/2020 | Laster et al. | |
| 2021/0141048 A1 | 5/2021 | Laster et al. | |
| 2021/0165068 A1 * | 6/2021 | Clark | H04N 1/00411 |
| 2022/0373663 A1 * | 11/2022 | Caspall | G01S 7/6272 |
| 2022/0390542 A1 * | 12/2022 | Clark | G01S 15/89 |
| 2022/0404491 A1 * | 12/2022 | Caspall | G01S 7/521 |

FOREIGN PATENT DOCUMENTS

| | | |
|---|---|---|
| CA | 3042656 A1 | 11/2019 |
| EP | 3572837 A1 | 11/2019 |
| KR | 20160121915 A | 10/2016 |
| WO | WO 1997/004334 A1 | 2/1997 |
| WO | WO 2006/017511 A2 | 2/2006 |
| WO | WO 2013/126761 A1 | 8/2013 |
| WO | WO 2014/144471 A1 | 9/2014 |
| WO | WO 2016/205938 A1 | 12/2016 |
| WO | WO 2018/201097 A2 | 11/2018 |

OTHER PUBLICATIONS

"SAMM"; *Oceanic Imaging Consultants*, retrieved Feb. 12, 2021 from https://www.geomatrix.co.uk/software/oceanographic-and-hydrographic/samm/.

WASSP Multibeam; retrieved from <https://wassp.com/video/26/WASSP-S3-Demo-WEB.mp4> May 17, 2018.

Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.

Ellison, Ben; Panbo; The Marine Electronics Hub; "Maptech i3 fishfinder road trip" Jun. 15, 2005; retrieved from <https://www.panbo.com/maptech-i3-fishfinder-road-trip>.

ADS, Inc.; "SeaBotix—Underwater Remotely Operated Vehicles (ROVs)"; *YouTube*, Jul. 16, 2014; retrieved from https://www.youtube.com/watch?v=hkqJh5j6eQA.

Teledyne Marine; "SmartFlight 2.0 powered by Greensea"; retrieved Jun. 19, 2019 from http://www.teledynemarine.com/smartflight2-0?ProductLineID=112.

"LED Programmable Message Pocket Fan & Rave Toy"; retrieved Jan. 31, 2019 from https://www.amazon.com/LED-Programmable-Message-Pocket-Rave/dp/B002FWOYG2.

AguaDrone—The World's First Drone with a Fish Finder! website visited Oct. 25, 2016 (10 pgs.) https://www.aguadrone.com/.

AeroKontiki—Introducing the world's first autopilot fishing drone kontiki website visited Oct. 25, 2016 (4 pgs.) http://www.aerokontiki.com/.

DIY Drones—The Leading Community for Personal UAVs—Home website visited Oct. 25, 2016 (9 pgs.) www.diydrones.com.

DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

Visual Aerials—Flying Off a Boat—Mark and Romeo's Aerial Adventures website visited Oct. 25, 2016 (3 pgs.) http://www.visual-aerials.com/flying-off-a-boat.html.

Unmanned Marine Systems USV Website visited Oct. 26, 2016 (12 pgs.) http://www.unmannedsystemstechnology.com/company/autonomous-surface-vehicles-ltd/.

\* cited by examiner

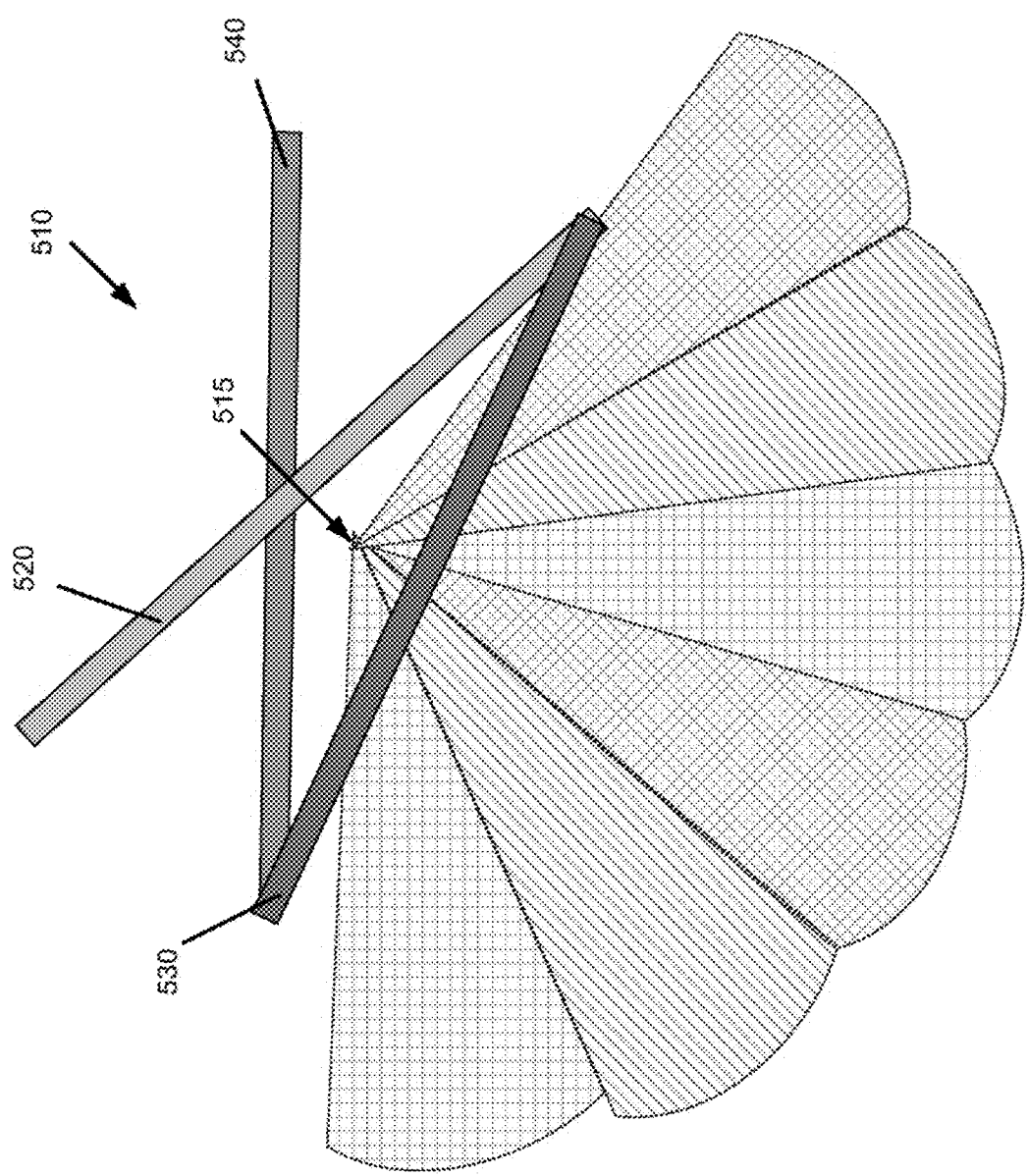

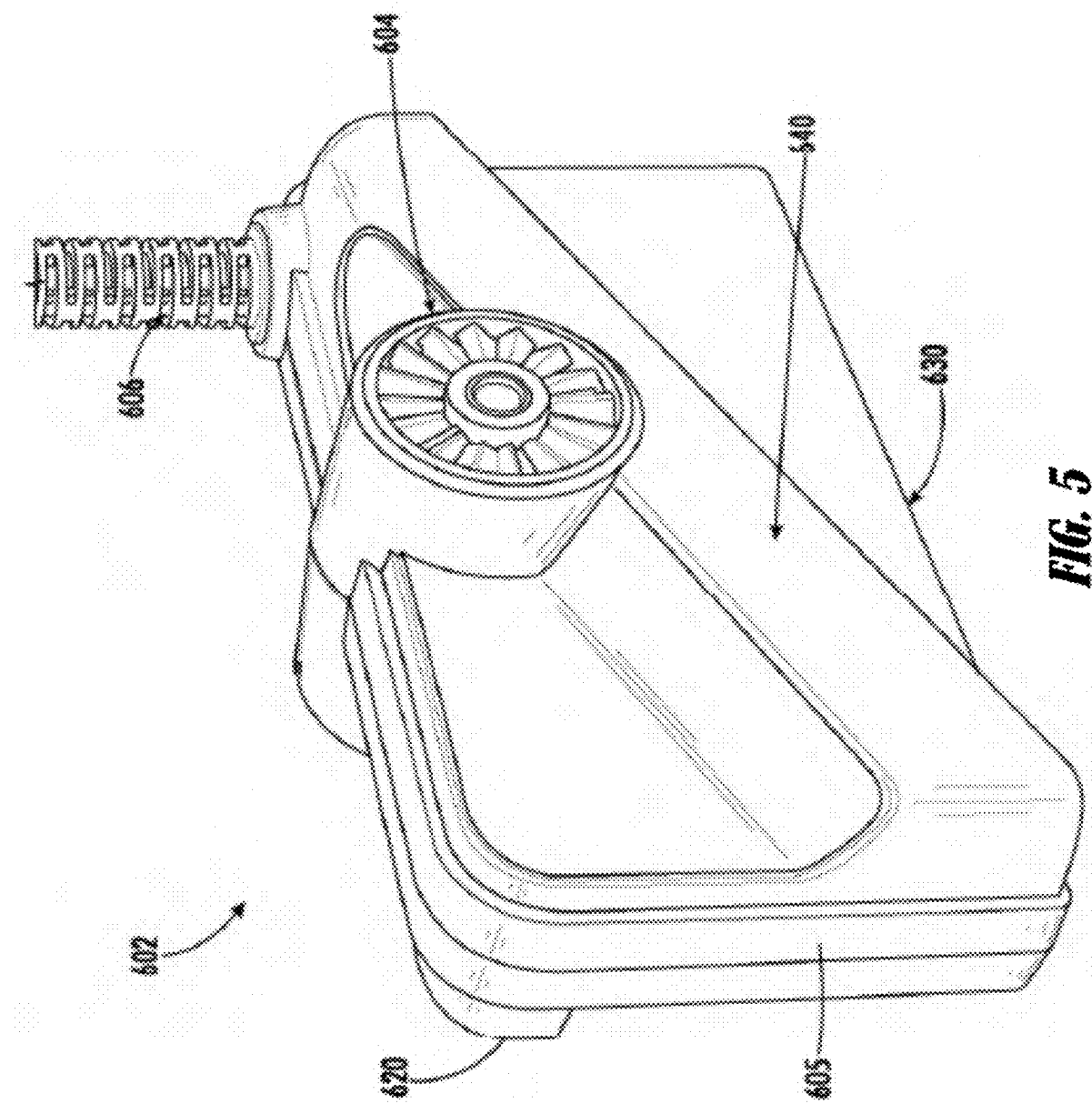

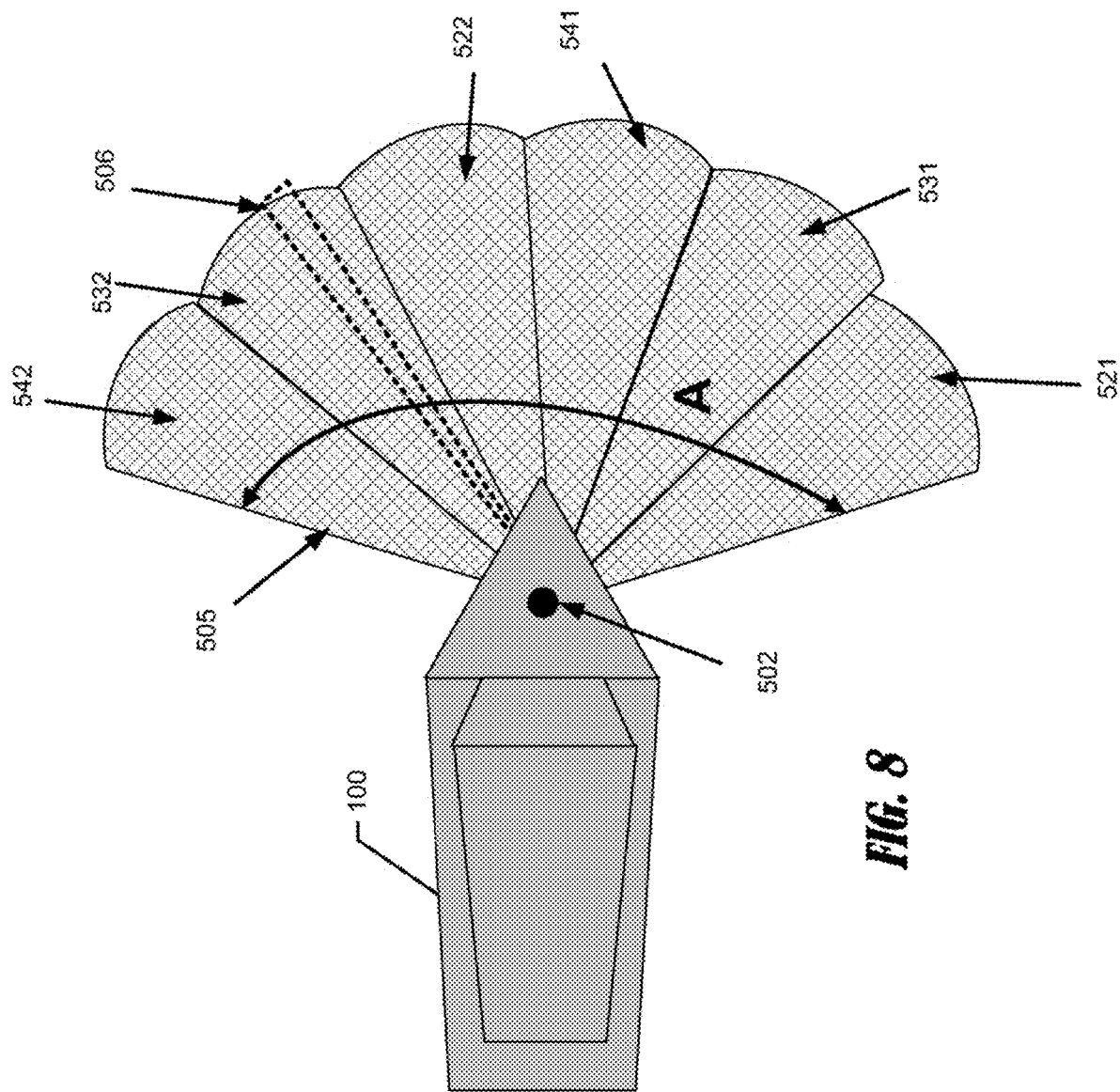

MARINE CHART AND SONAR IMAGE PRESENTATION SYSTEMS AND METHODS

CROSS-REFERENCE TO RELATED APPLICATION(S)

This application claims priority to and is a continuation of U.S. Non-Provisional application Ser. No. 17/174,415, filed Feb. 12, 2021, entitled "Marine Chart and Sonar Image Presentation Systems and Methods", which claims priority to and is a continuation-in-part of U.S. Non-Provisional application Ser. No. 17/123,189, filed Dec. 16, 2020, entitled "Marine Electronic Device for Presentment of Nautical Charts and Sonar Images", issued as U.S. Pat. No. 11,435,427, which claims priority to and is a continuation of U.S. Non-Provisional application Ser. No. 15/982,362, filed May 17, 2018, entitled "Marine Electronic Device for Presentment of Nautical Charts and Sonar Images", issued as U.S. Pat. No. 10,914,810; the contents of each being hereby incorporated by reference in its entirety.

FIELD OF THE INVENTION

Embodiments of the present invention relate generally to presentation of marine data, and more particularly, to providing for improved display features regarding sonar data on nautical charts.

BACKGROUND OF THE INVENTION

Nautical charts including electronic or interactive nautical charts are typically used to provide a user with information about a body of water including (but not limited to) depth, routes, areas of interest, or the like. In some examples, nautical charts may also provide an indication of the location of a vessel (e.g., watercraft) associated with a chart display device. Further, some nautical charts may also display the location, course, speed, and/or other information for one or more other vessels on the body of water, such as provided by automatic identification system (AIS).

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects.

The sonar return signals can also be processed to be presented on a display, giving the user a "picture" or image of the underwater environment. Notably, however, it can be difficult to understand the coverage of the sonar in relation to the body of water, such as to understand where objects in the sonar image are in the real world.

BRIEF SUMMARY OF THE INVENTION

A display can be used to present marine information (such as sonar images or nautical charts) to a user. For example, a display may present a sonar image and a nautical chart in a split screen format or one is selected and displayed at a given time. The distributed or binary display of the nautical chart and sonar image may result in a user consulting several displays and/or making several selections on a user interface in an effort to determine the sonar coverage on the actual body of water.

To understand the surface and submerged conditions of a body water, a user may consult a nautical chart and one or more sonar images. The nautical chart may be separate and unrelated to incoming sonar data collected by one or more sonar transducers. Since the nautical chart and sonar images are separate and not correlated, the user may have to determine or infer information between the nautical chart and the sonar images. It may be difficult and/or time consuming for the user to ascertain the condition of the body of water, which may detract from the commercial or recreational activities of the vessel.

As noted above, it can be difficult to determine the real world sonar coverage provided by the various sonar transducers of the watercraft. The sonar beam shape (of the sonar beams emitting from the sonar transducer(s)) may be unknown or difficult to determine by the user, as well as the understanding of how that sonar beam shape fits within the underwater environment. Accordingly, the corresponding coverage of the sonar beams may be difficult to understand, making it difficult to link the objects in the sonar imagery with their actual location within the body of water.

Some embodiments of the present invention aim to provide useful information that will aid the user in determining and understanding the sonar coverage of the underwater environment. In some embodiments of the present invention, the sonar image may be presented on the nautical chart to visually indicate the sonar coverage. The orientation, sonar beam shape and size, and/or relative position of the sonar transducer with respect to watercraft may be accounted for in the presentation of the sonar image overlay presented on the chart.

Example embodiments of the present invention provide various sonar systems for imaging an underwater environment. Some example sonar systems provide for generating a live sonar image that represents an image of a volume of the underwater environment that is updating in real-time. In this regard, in some embodiments, the sonar system may include one or more arrays of sonar transducer elements that operate to beamform multiple sonar return beams. The multiple sonar return beams can be filtered, such as based on frequency, to receive sonar returns in sonar beam slices (e.g., around 0.5°-1° beam angle). The sonar beam slices build-up to form the live sonar image extending across an overall sonar beam angle (e.g., multiple adjacent slices may form an overall coverage angle, such as ~135°). Since the sonar beam slices update continually, the resulting sonar image updates. Accordingly, the system may be configured to generate a corresponding two-dimensional (2D) near-real time (or "live") sonar image.

In some example embodiments, the array(s) may be oriented such that the facing direction of the sonar image is generally outward of the watercraft. In such an example, the sonar image may extend in a horizontal plane, such as may correspond with the horizontal plane of a nautical chart. Accordingly, in some embodiments, the system may be configured to cause presentation of the live sonar image in the facing direction on the chart and relative to a representation of the watercraft so as to provide live sonar imagery on the chart to visually provide a relationship between objects within the live sonar imagery and a real-world position of the objects.

In some embodiments, the effective distance of the sonar coverage for the live sonar image may be accounted for during presentation on the chart. In this regard, the size of the sonar image on the chart may dimensionally correspond to the size of the sonar beam coverage within the underwater environment. Likewise, in some example embodiments, as the zoom level of the chart changes, the corresponding size of the sonar image presented thereon may also adjust to maintain the dimensional correspondence. In such examples, a user can more accurately understand where an object presented in the sonar image is in the real world. This may be useful for casting a fishing line or setting an anchor, among other things.

In some embodiments, the array may be rotatable with respect to the watercraft. Accordingly, the orientation of the sonar image of the chart with respect to the watercraft may be adjusted based on the current facing direction of the array. Additionally, in some embodiments, past sonar images can be maintained to help a user build-up a sonar image of the underwater environment (e.g., the user may build up a 360° view around the watercraft). In some embodiments, the past sonar images may fade away as time passes to create a visual indication of the older sonar imagery.

In some embodiments, indications of the location of various objects (e.g., fish, structure, etc.) within the sonar data could be presented on the nautical chart, such as within the sonar image. Along these lines, in some embodiments, tracking of the object may occur as time progresses, which may cause the indicator to move within the sonar image. In some embodiments, a trail may be presented to indicate past locations of the tracked object.

In an example embodiment, a system for presenting marine information is provided. The system comprises at least one array of a plurality of sonar transducer elements associated with a watercraft on a body of water and oriented with an emitting face in a facing direction. The facing direction is generally outward of the watercraft. The plurality of sonar transducer elements are configured to transmit one or more sonar beams into the underwater environment. The system further includes a display; one or more processors; and a memory including computer program code. The computer program code is configured to, when executed, cause the one or more processors to: cause, on the display, presentation of a chart including at least a portion of the body of water; cause, on the display, presentation of a representation of the watercraft at a position on the chart corresponding to a current location of the watercraft; operate the array to cause the plurality of sonar transducer elements to transmit the one or more sonar beams into the underwater environment; and receive sonar return data from the plurality of sonar transducer elements of the array. The computer program code is further configured to cause the one or more processors to generate a sonar image of the underwater environment outward from the watercraft, wherein the sonar image is a two-dimensional live sonar image that is formed of the sonar return data, and wherein the sonar return data used to form the two-dimensional live sonar image was received at substantially a same time by the plurality of sonar transducer elements. The computer program code is further configured to cause the one or more processors to cause the one or more processors to determine the facing direction; and cause, on the display, presentation of the sonar image in the facing direction on the chart and relative to the representation of the watercraft, wherein the sonar image is presented in the facing direction on the chart so as to visually provide a relationship between objects within the live sonar imagery and a real-world position of the objects.

In some embodiments, the plurality of sonar transducer elements are configured to operate at a fixed phase shift and vary in frequency so as to beamform multiple sonar return beams. The computer program code is further configured to, when executed, cause the one or more processors to filter the sonar return data based on frequency to form the multiple sonar return beams, wherein the two-dimensional live sonar image is formed of the sonar return data from each of the multiple sonar return beams. In some embodiments, the sonar return data used to form the two-dimensional live sonar image is updated in real-time, and each of the multiple sonar return beams provides an angled slice of coverage extending outward from the emitting face in different directions. When pieced together, the angled slices form a coverage area in a horizontal plane extending outwardly from the watercraft. The coverage area defines an overall coverage angle and extends a radial distance outwardly from the emitting face. In some embodiments, the computer program code is further configured to, when executed, cause the one or more processors to cause presentation of the sonar image on the chart such that the sonar image extends outwardly from the representation of the watercraft on the chart a distance dimensionally corresponding to the radial distance of the coverage area to thereby visually indicate the real word coverage area of the two-dimensional live sonar image. In some embodiments, the computer program code is further configured to, when executed, cause the one or more processors to determine a zoom level of the chart being presented on the display; and adjust a size of the sonar image based on the zoom level of the chart for presentation of the sonar image on the chart at the zoom level.

In some embodiments, the overall coverage angle defines an angle within the range of 90° to 140°.

In some embodiments, the at least one array is a first array, the sonar image is a first sonar image, and the corresponding facing direction of the first array is a first facing direction. The system further includes a second array of a plurality of sonar transducer elements associated with the watercraft and oriented with a second emitting face in a second facing direction. The second facing direction is generally outward of the watercraft and is different than the first facing direction. The computer program code is further configured to, when executed, cause the one or more processors to operate the second array; receive second sonar return data from the plurality of sonar transducer elements of the second array; and generate a second sonar image of the underwater environment outward from the watercraft. The second sonar image is a second two-dimensional live sonar image that is formed of the second sonar return data. The second sonar return data used to form the second two-dimensional live sonar image was received at substantially the same time by the plurality of sonar transducer elements of the second array as the plurality of sonar transducer elements of the first array. The computer program code is further configured to cause the one or more processors to determine the second facing direction; and cause, on the display, presentation of the second sonar image in the second facing direction on the chart and relative to the representation of the watercraft while the first sonar image is presented on the chart. In some embodiments, the first sonar image defines a first coverage area in a horizontal plane extending outwardly from the watercraft. The first coverage area defines a first overall coverage angle. The second sonar image defines a second coverage area in the horizontal plane extending outwardly from the watercraft. The second coverage area defines a second overall coverage angle. The first coverage area is different from the second coverage area such that the first coverage area does not overlap the second coverage area. In some embodiments, the computer program code is further configured to, when executed, cause the one or more processors to cause presentation of a plurality of sonar images on the chart to form a 360° sonar image around the representation of the watercraft, wherein the plurality of sonar images includes at least the first sonar image and the second sonar image.

In some embodiments, the sonar image is a first sonar image based on sonar return data received at a first time, and the facing direction is a first facing direction. The array of a plurality of sonar transducer elements is rotatable with respect to the watercraft. The system further comprises a direction sensor configured to sense a direction of the array. The computer program code is further configured to, when executed, cause the one or more processors to operate the array to cause the plurality of sonar transducer elements to transmit one or more second sonar beams into the underwater environment in a second facing direction at a second time that is after the first time; receive second sonar return data from the plurality of sonar transducer elements of the array; and generate a second sonar image of the underwater environment outward from the watercraft. The second sonar image is a two-dimensional live second sonar image that is formed of the second sonar return data. The computer program code is further configured to cause the one or more processors to determine, based on sensor data from the direction sensor, the second facing direction; and cause, on the display, presentation of the second sonar image in the second facing direction on the chart and relative to the representation of the watercraft. In some embodiments, the computer program code is further configured to, when executed, cause the one or more processors to cause presentation of the first sonar image to remain on the chart while causing presentation of the second sonar image. In some embodiments, the computer program code is further configured to, when executed, cause the one or more processors to cause presentation of the first sonar image to fade out over a period of time while causing presentation of the second sonar image.

In some embodiments, the system further comprises a direction sensor configured to sense a direction of the array. The computer program code is further configured to, when executed, cause the one or more processors to determine the facing direction based on sensor data from the direction sensor.

In some embodiments, the sonar image is presented as an overlay on the chart.

In some embodiments, the computer program code is further configured to, when executed, cause the one or more processors to determine an object within the sonar image; determine a position of the object within the sonar image; and cause, on the display, presentation of an indicator for the object at the position within the sonar image, wherein the indicator highlights or otherwise indicates the object within the sonar image. The computer program code is further configured to cause the one or more processors to determine an updated position of the object within the sonar image as the sonar image is updated based on additional sonar return data being captured; and cause, on the display, presentation of the indicator at the updated position so as to track the object within the two-dimensional live sonar image.

In some embodiments, the emitting face of the array defines a width and a length, wherein the length of the emitting face is greater than the width of the emitting face. The length of the emitting face extends in a fore-to-aft direction of the watercraft. Each of the plurality of sonar transducer elements defines a length and a width. The length of each of the plurality of sonar transducer elements is greater than the width of each of the plurality of sonar transducer elements. The length of each of the plurality of sonar transducer elements is perpendicular to the length of the emitting face.

In another example embodiment, a marine electronic device for presenting marine information is provided. The marine electronic device comprises a display; one or more processors; and a memory including computer program code. The computer program code is configured to, when executed, cause the one or more processors to cause, on the display, presentation of a chart including at least a portion of a body of water; cause, on the display, presentation of a representation of a watercraft at a position on the chart corresponding to a current location of the watercraft; and operate at least one array of a plurality of sonar transducer elements to cause the plurality of sonar transducer elements to transmit one or more sonar beams into an underwater environment of the body of water. The array is associated with the watercraft and oriented with an emitting face in a facing direction. The facing direction is generally outward of the watercraft. The computer program code is further configured to cause the one or more processors to receive sonar return data from the plurality of sonar transducer elements of the array and generate a sonar image of the underwater environment outward from the watercraft, wherein the sonar image is a two-dimensional live sonar image that is formed of the sonar return data. The sonar return data used to form the two-dimensional live sonar image was received at substantially a same time by the plurality of sonar transducer elements. The computer program code is further configured to cause the one or more processors to determine the facing direction; and cause, on the display, presentation of the sonar image in the facing direction on the chart and relative to the representation of the watercraft, wherein the sonar image is presented in the facing direction on the chart so as to visually provide a relationship between objects within the live sonar imagery and a real-world position of the objects.

In some embodiments, the plurality of sonar transducer elements are configured to operate at a fixed phase shift and vary in frequency so as to beamform multiple sonar return beams. The computer program code is further configured to, when executed, cause the one or more processors to filter the sonar return data based on frequency to form the multiple sonar return beams. The two-dimensional live sonar image is formed of the sonar return data from each of the multiple sonar return beams. The sonar return data used to form the two-dimensional live sonar image is updated in real-time. Each of the multiple sonar return beams provides an angled slice of coverage extending outward from the emitting face in different directions. When pieced together, the angled slices form a coverage area in a horizontal plane extending outwardly from the watercraft. The coverage area defines an overall coverage angle and extends a radial distance outwardly from the emitting face.

In some embodiments, the computer program code is further configured to, when executed, cause the one or more processors to cause presentation of the sonar image on the chart such that the sonar image extends outwardly from the representation of the watercraft on the chart a distance dimensionally corresponding to the radial distance of the coverage area to thereby visually indicate the real word coverage area of the two-dimensional live sonar image.

In yet another example embodiment, a method for presenting marine information is provided. The method comprises causing, on a display, presentation of a chart including at least a portion of a body of water; causing, on the display, presentation of a representation of a watercraft at a position on the chart corresponding to a current location of the watercraft; and operating at least one array of a plurality of sonar transducer elements to cause the plurality of sonar transducer elements to transmit one or more sonar beams into an underwater environment of the body of water. The array is associated with the watercraft and oriented with an emitting face in a facing direction. The facing direction is generally outward of the watercraft. The method further comprises receiving sonar return data from the plurality of sonar transducer elements of the array and generating a sonar image of the underwater environment outward from the watercraft. The sonar image is a two-dimensional live sonar image that is formed of the sonar return data. The sonar return data used to form the two-dimensional live sonar image was received at substantially a same time by the plurality of sonar transducer elements. The method further comprises determining the facing direction and causing, on the display, presentation of the sonar image in the facing direction on the chart and relative to the representation of the watercraft. The sonar image is presented in the facing direction on the chart so as to visually provide a relationship between objects within the live sonar imagery and a real-world position of the objects.

Additional example embodiments of the present invention include methods, systems, and computer program products associated with various embodiments described herein.

BRIEF DESCRIPTION OF THE DRAWINGS

Figure 1:
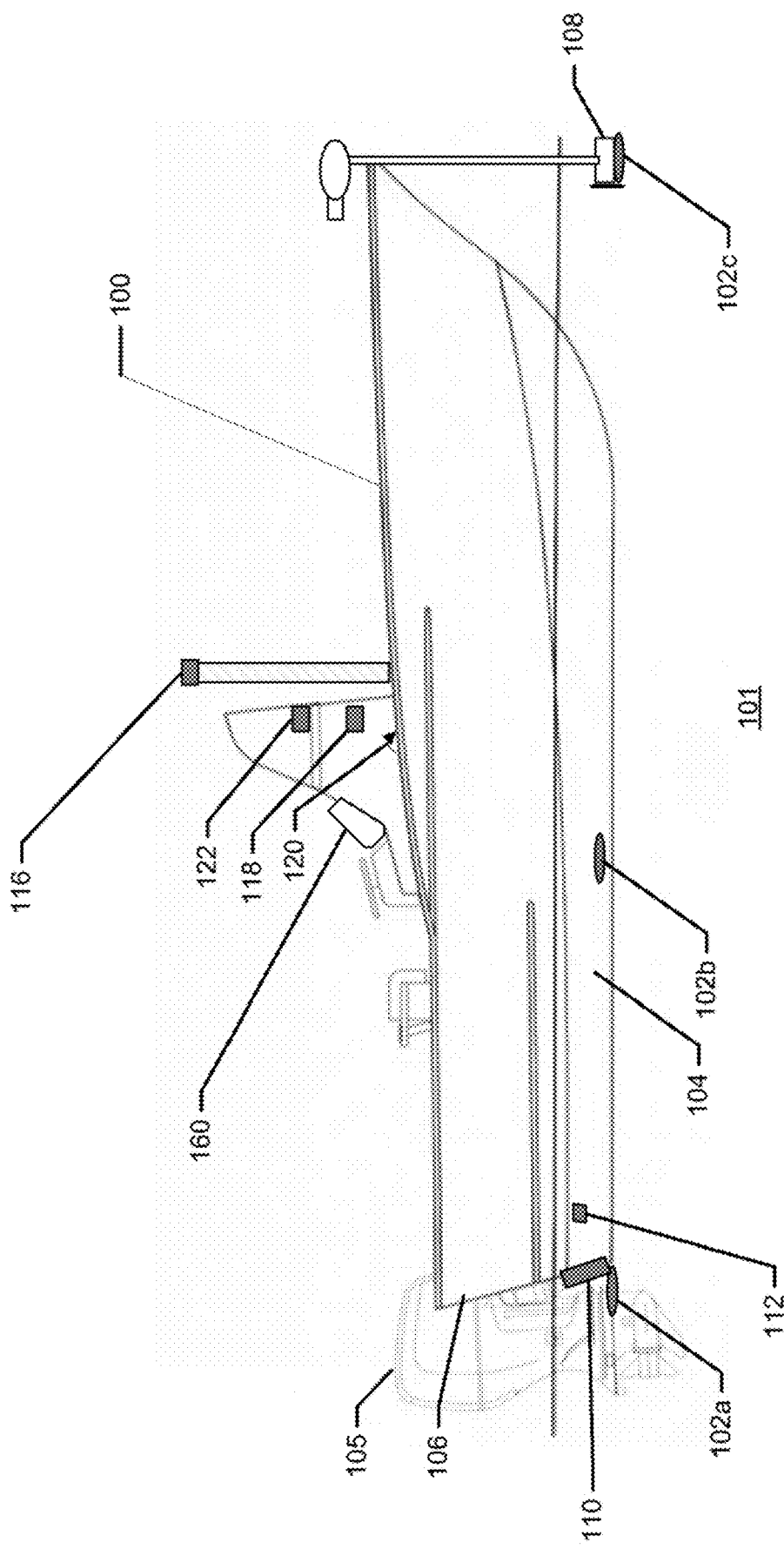
Figure 2A:
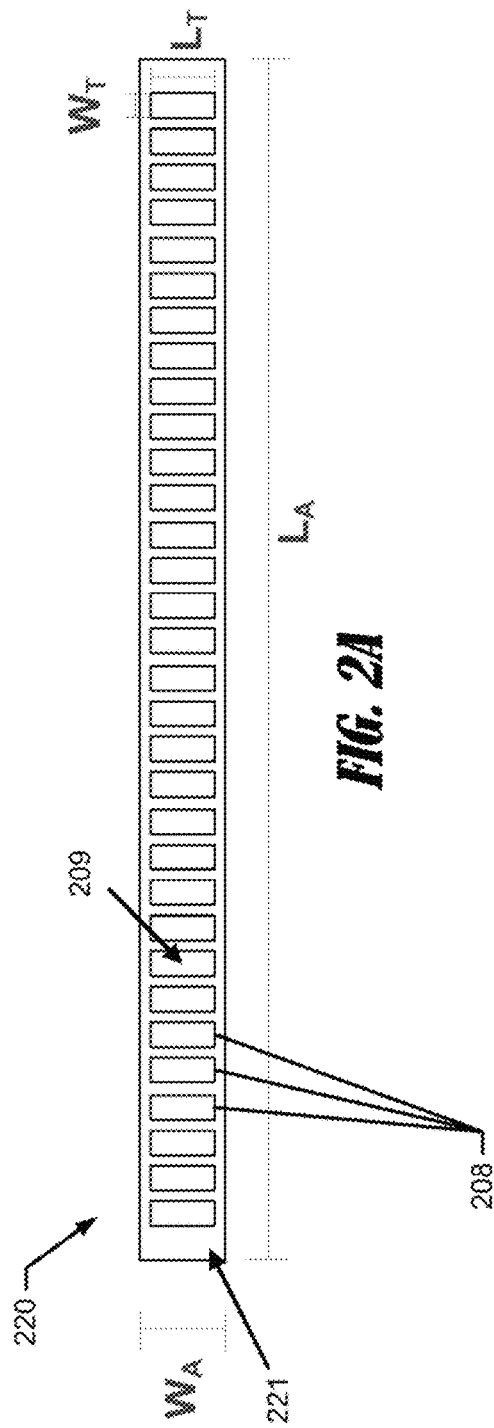
Figure 2B:
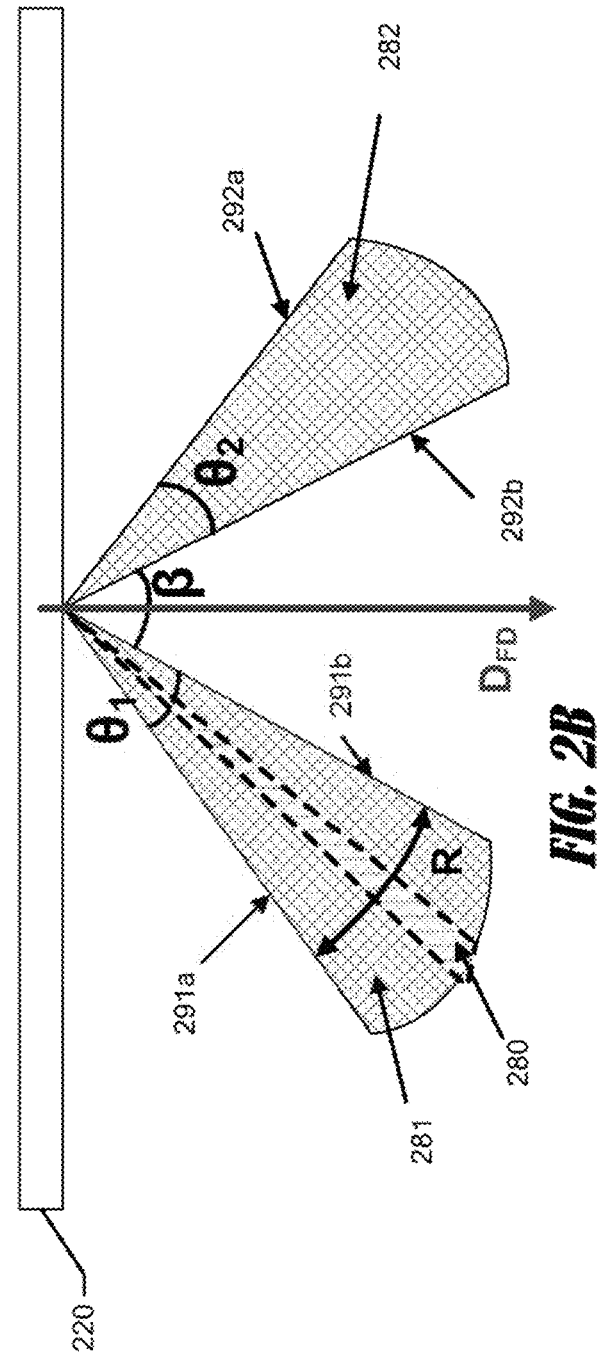
Figure 2C:
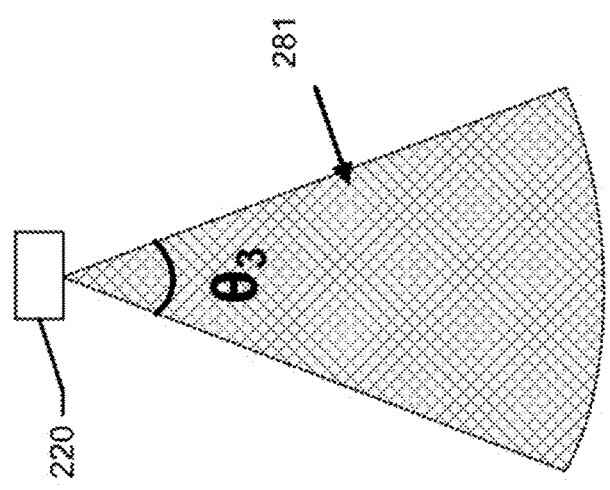
Figure 3:
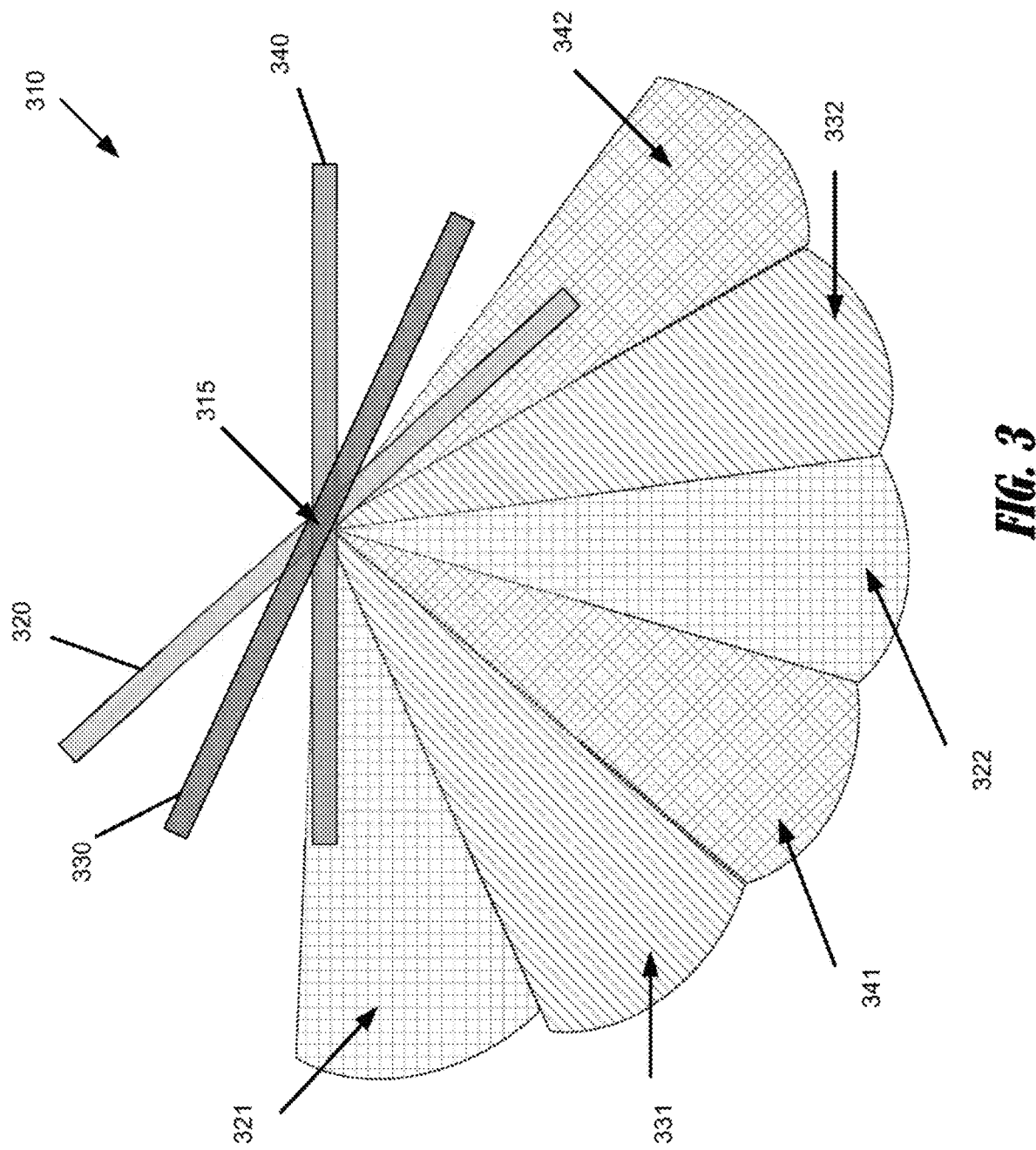
Figure 3A:
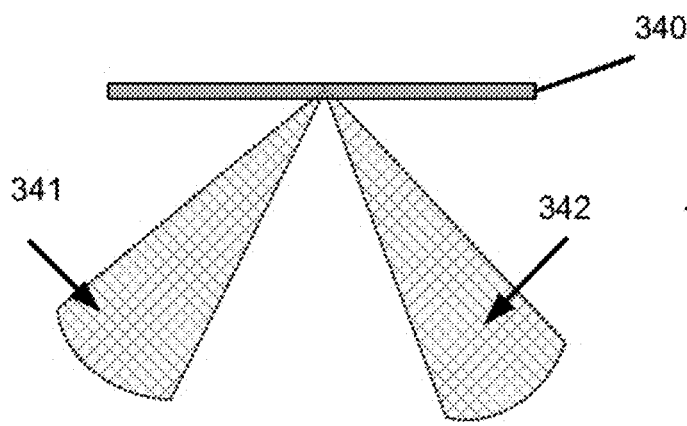
Figure 3B:
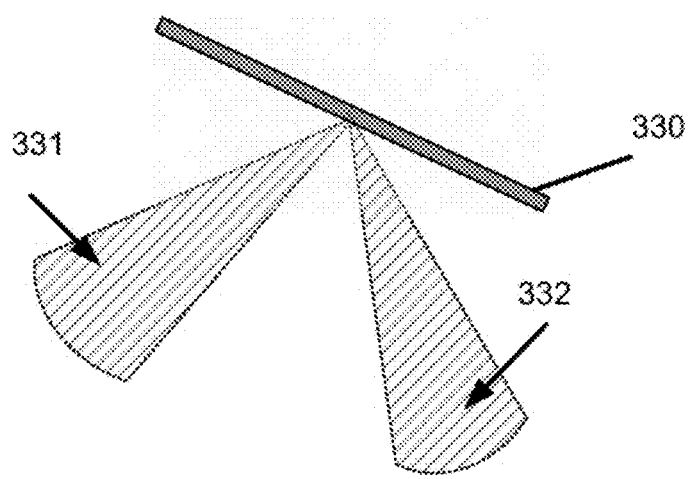
Figure 3C:
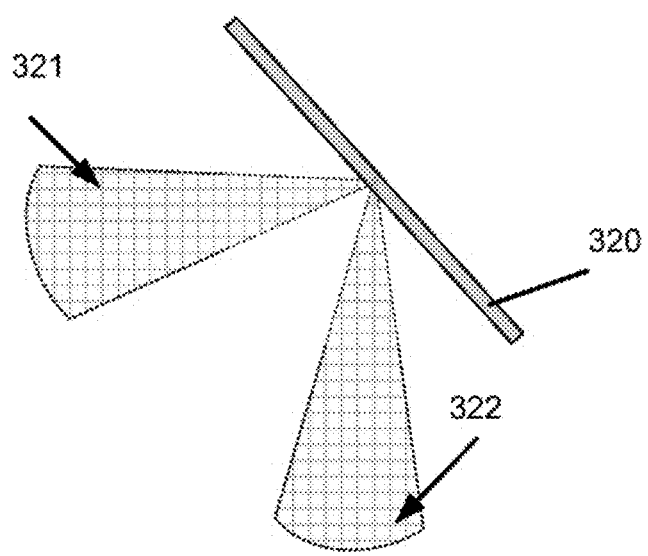
Figure 6:
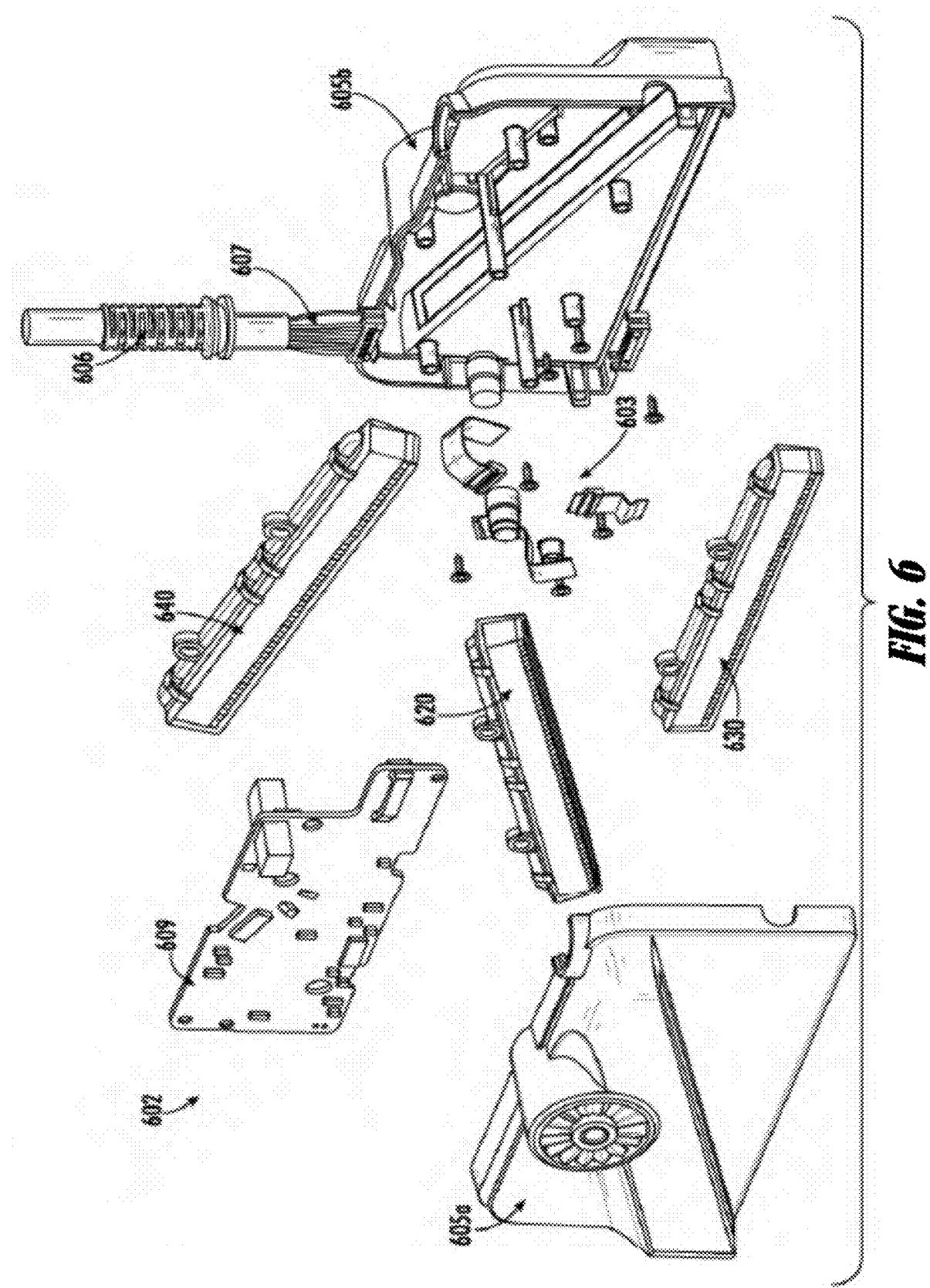
Figure 7B:
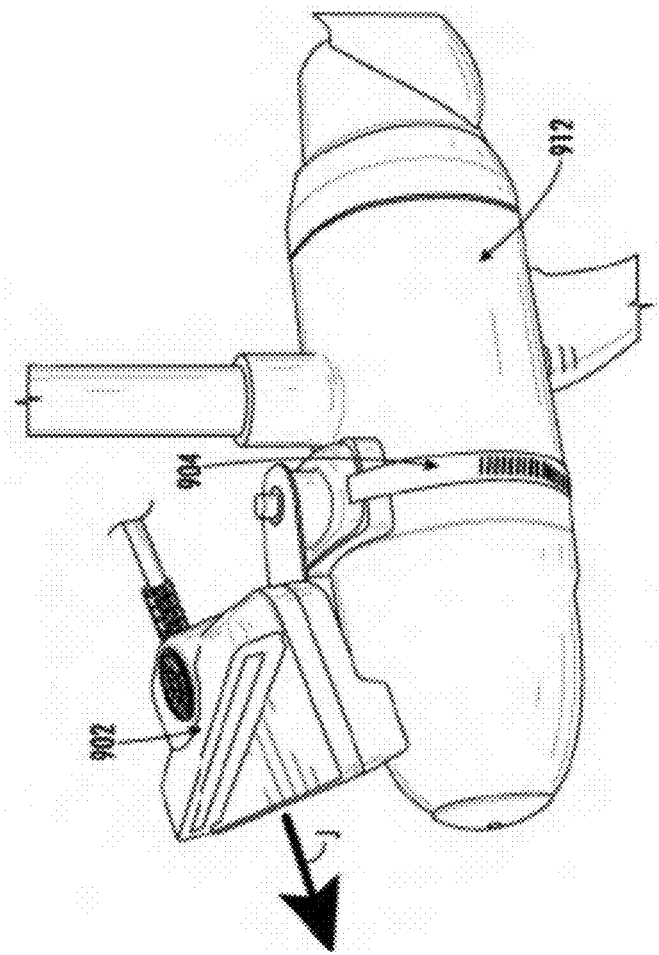
Figure 7A:
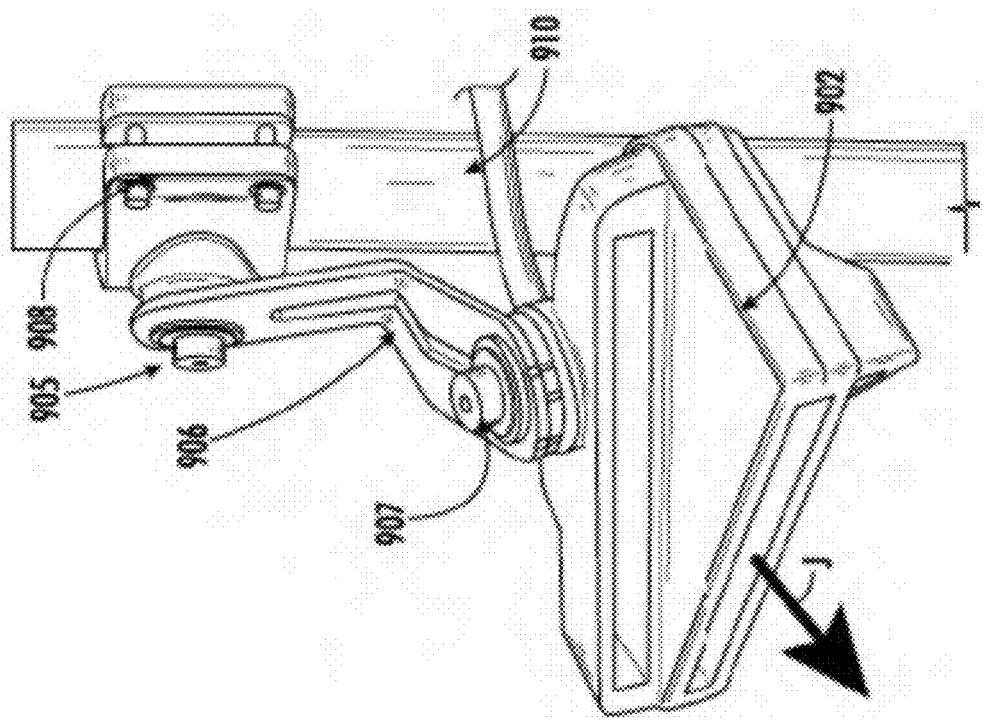
Figure 9:
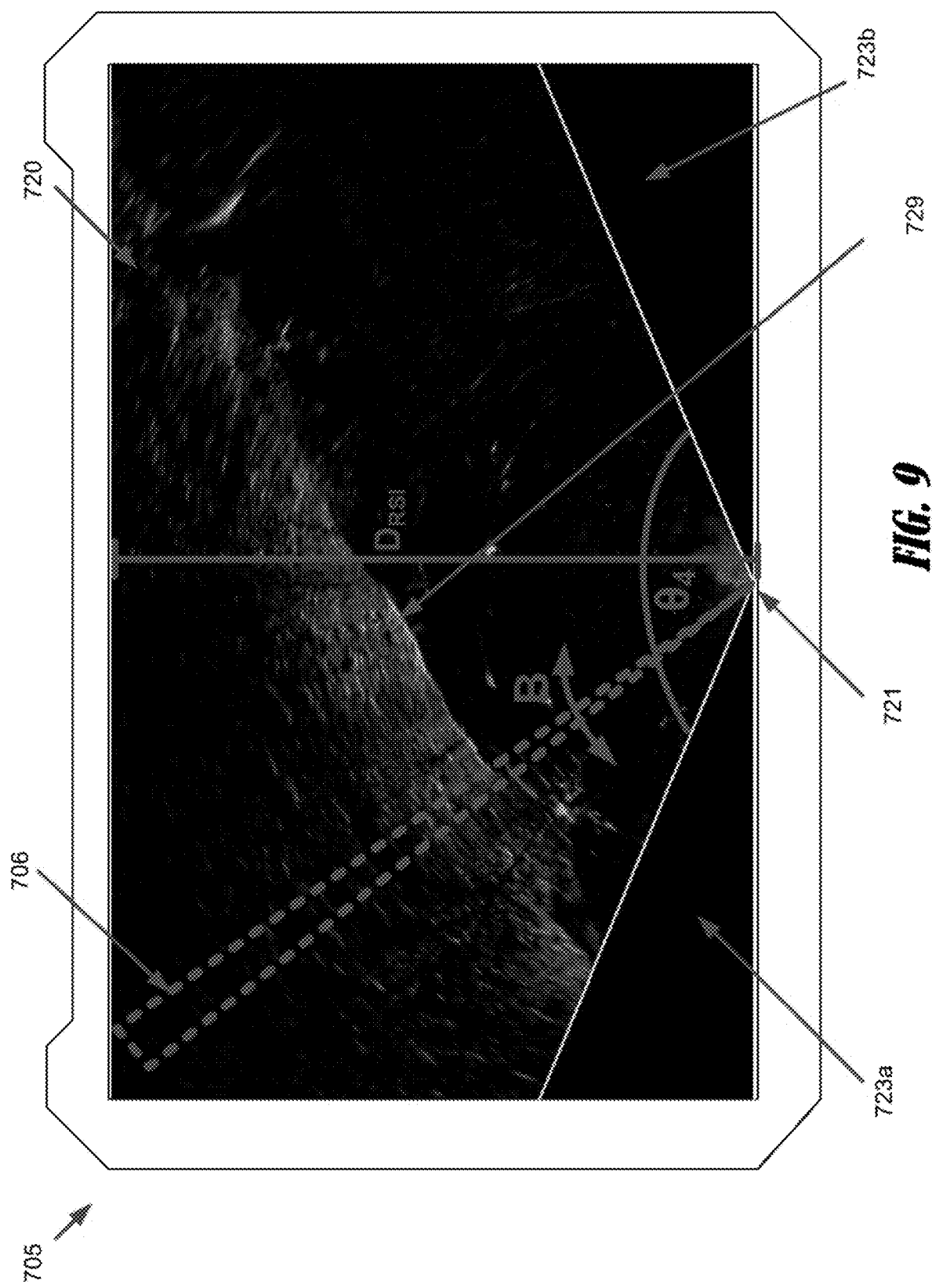
Figure 10:
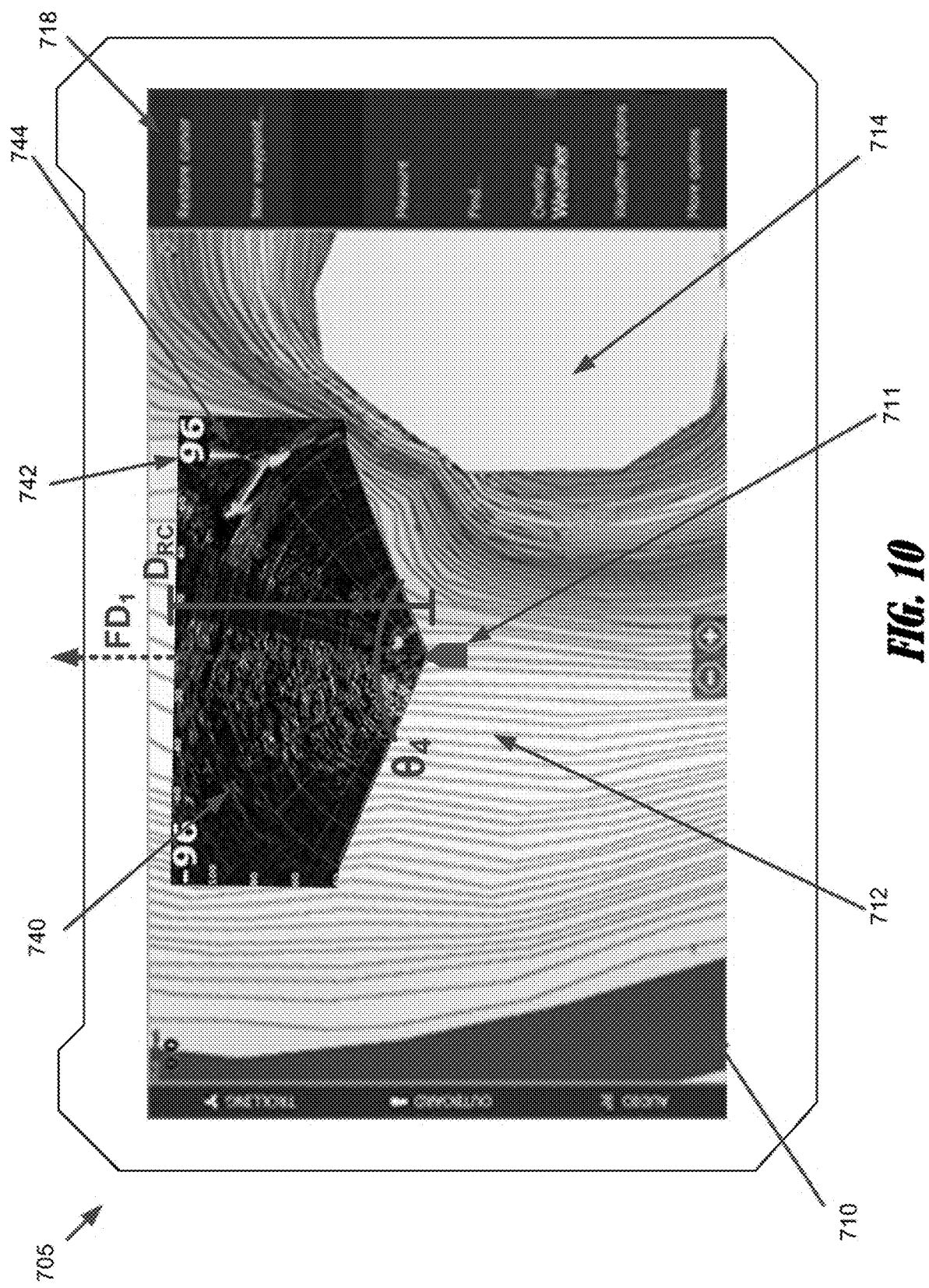
Figure 11:
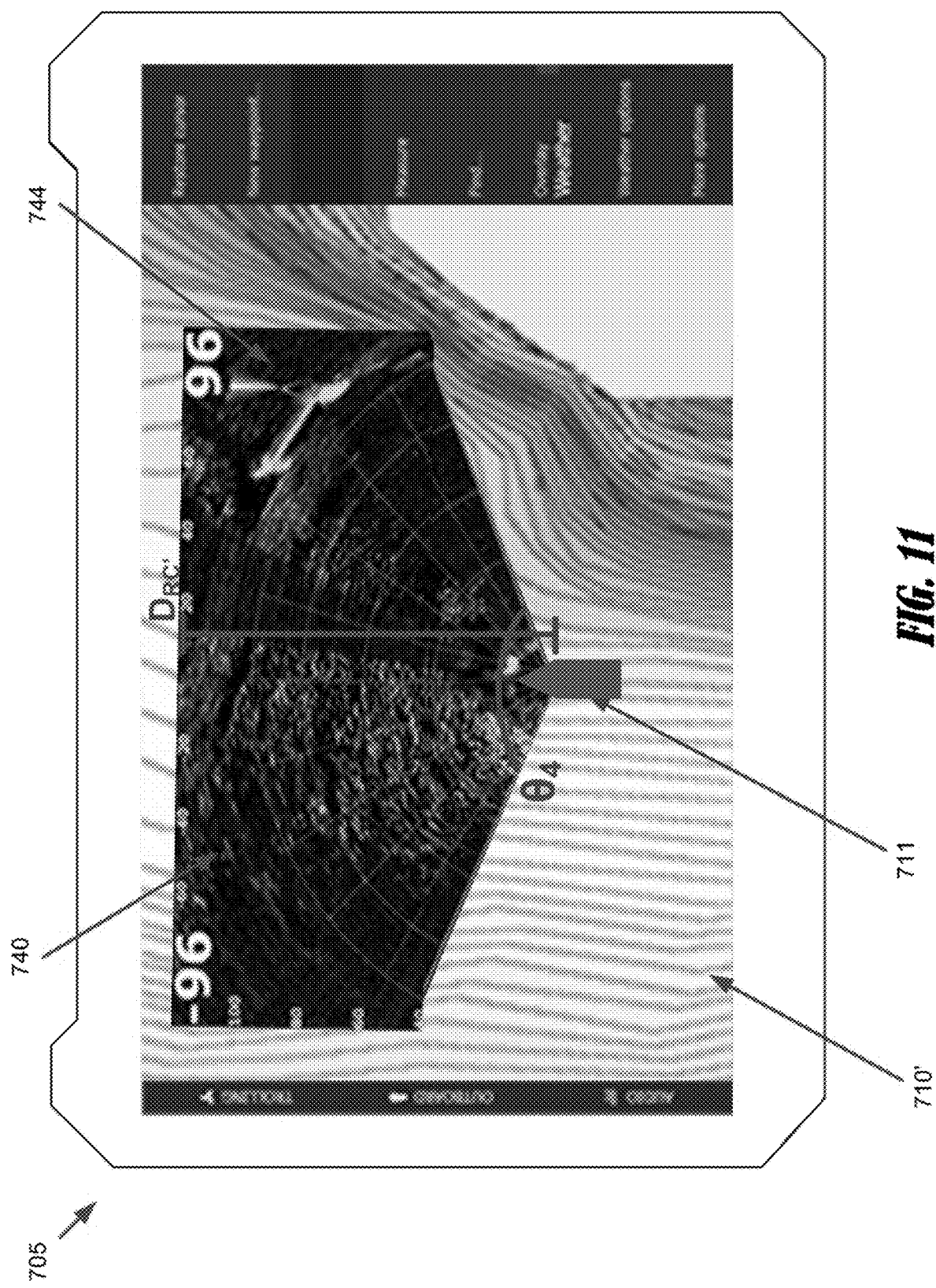
Figure 12:
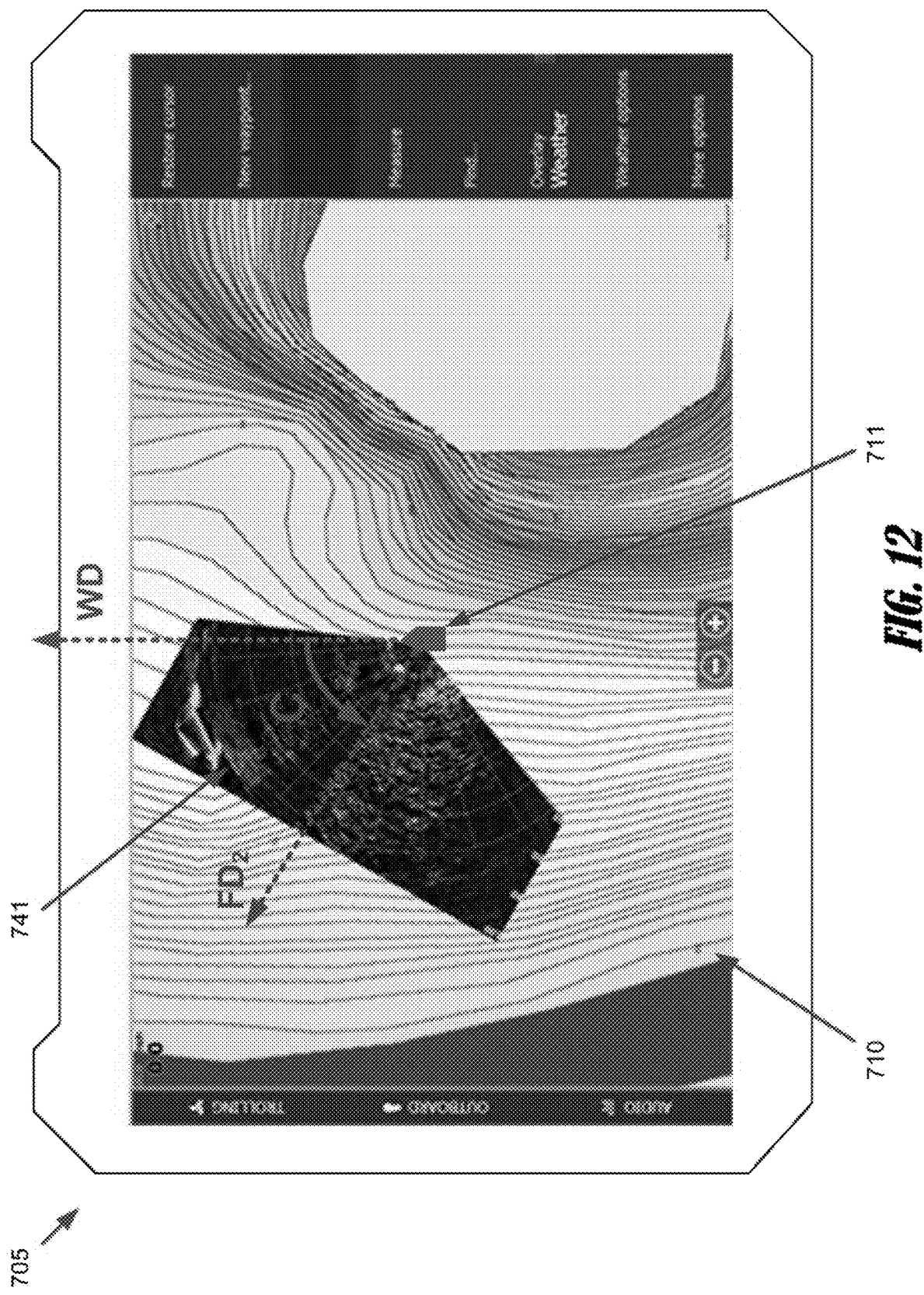
Figure 13:
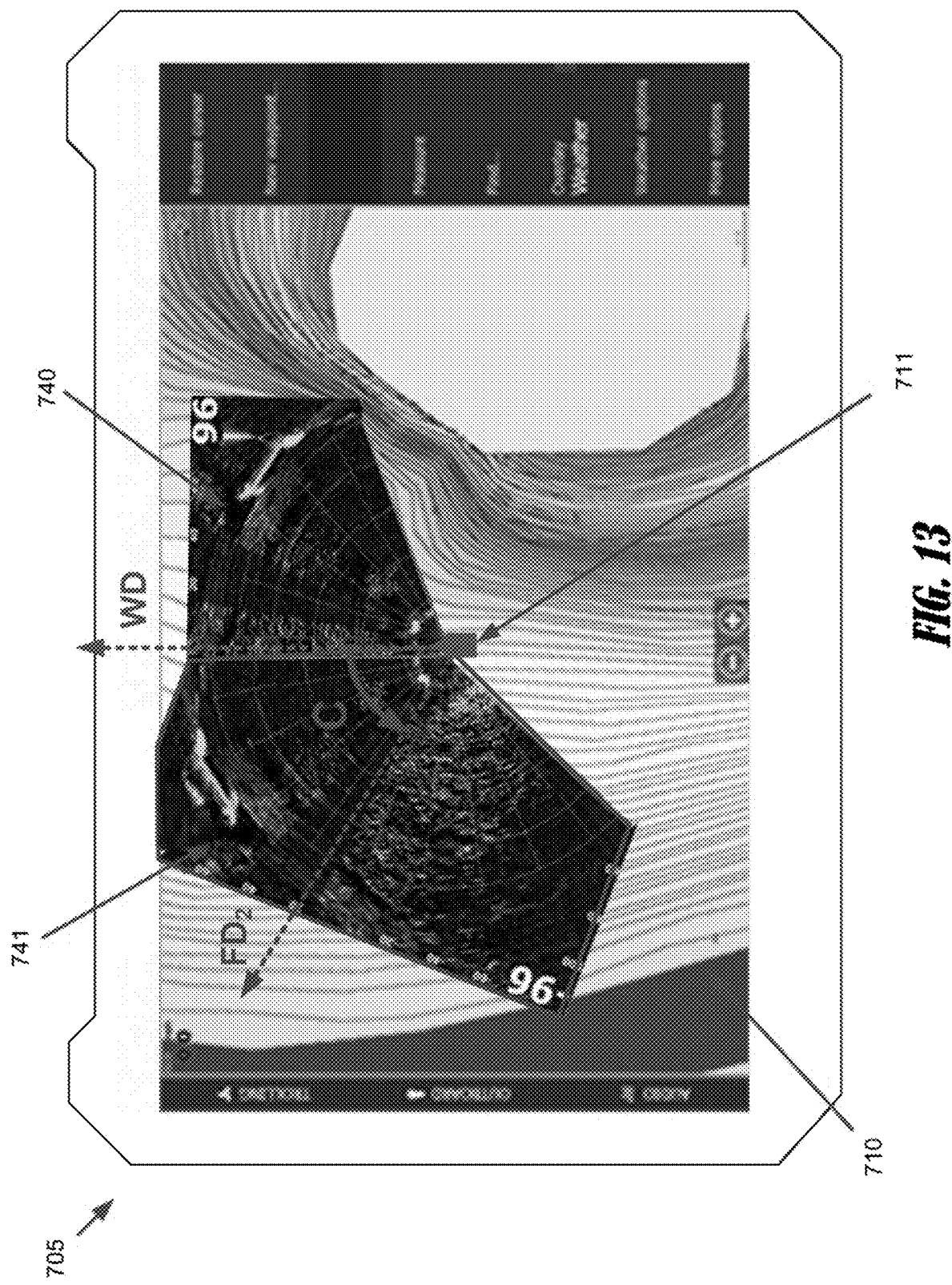
Figure 14:
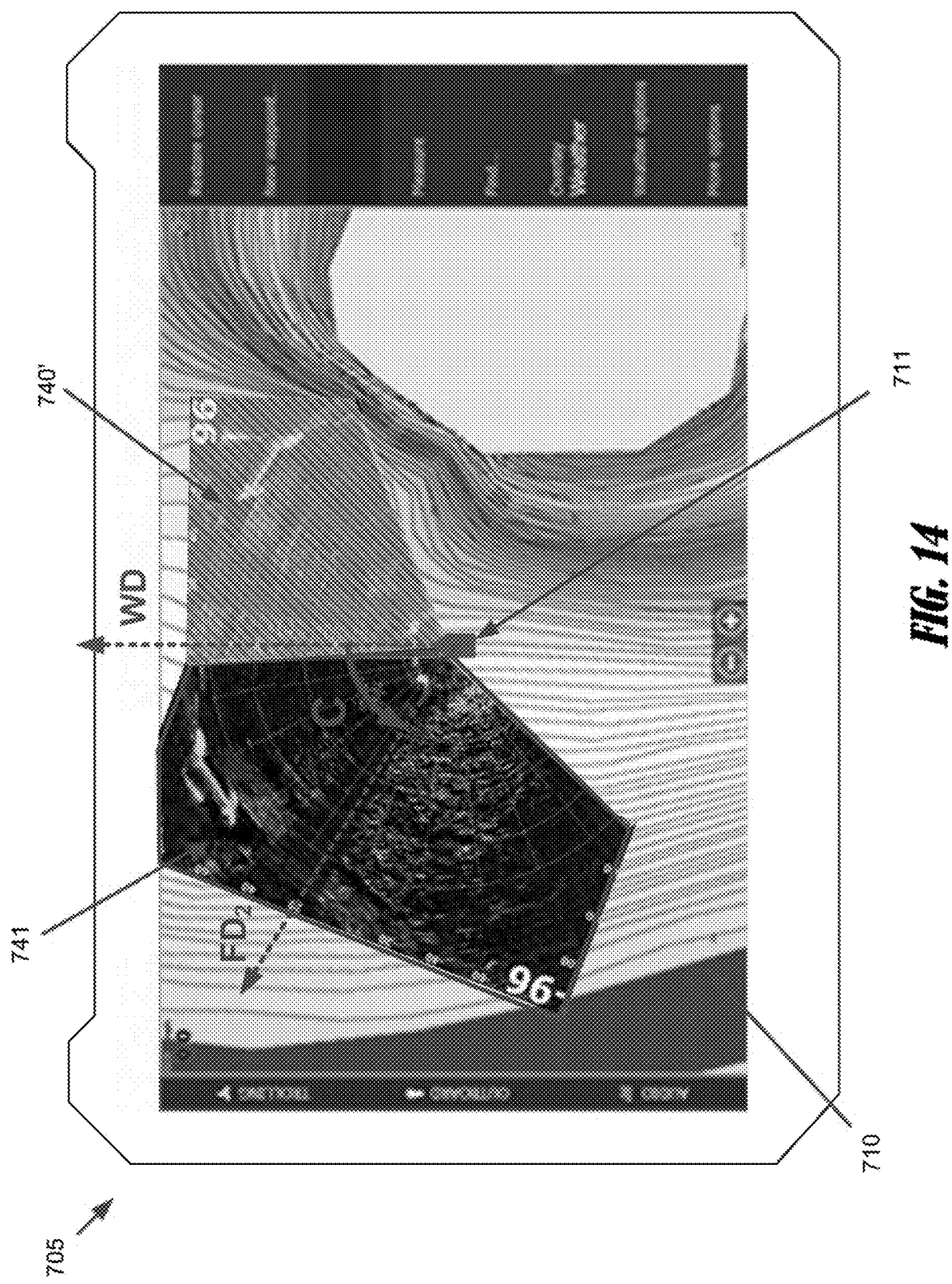
Figure 15:
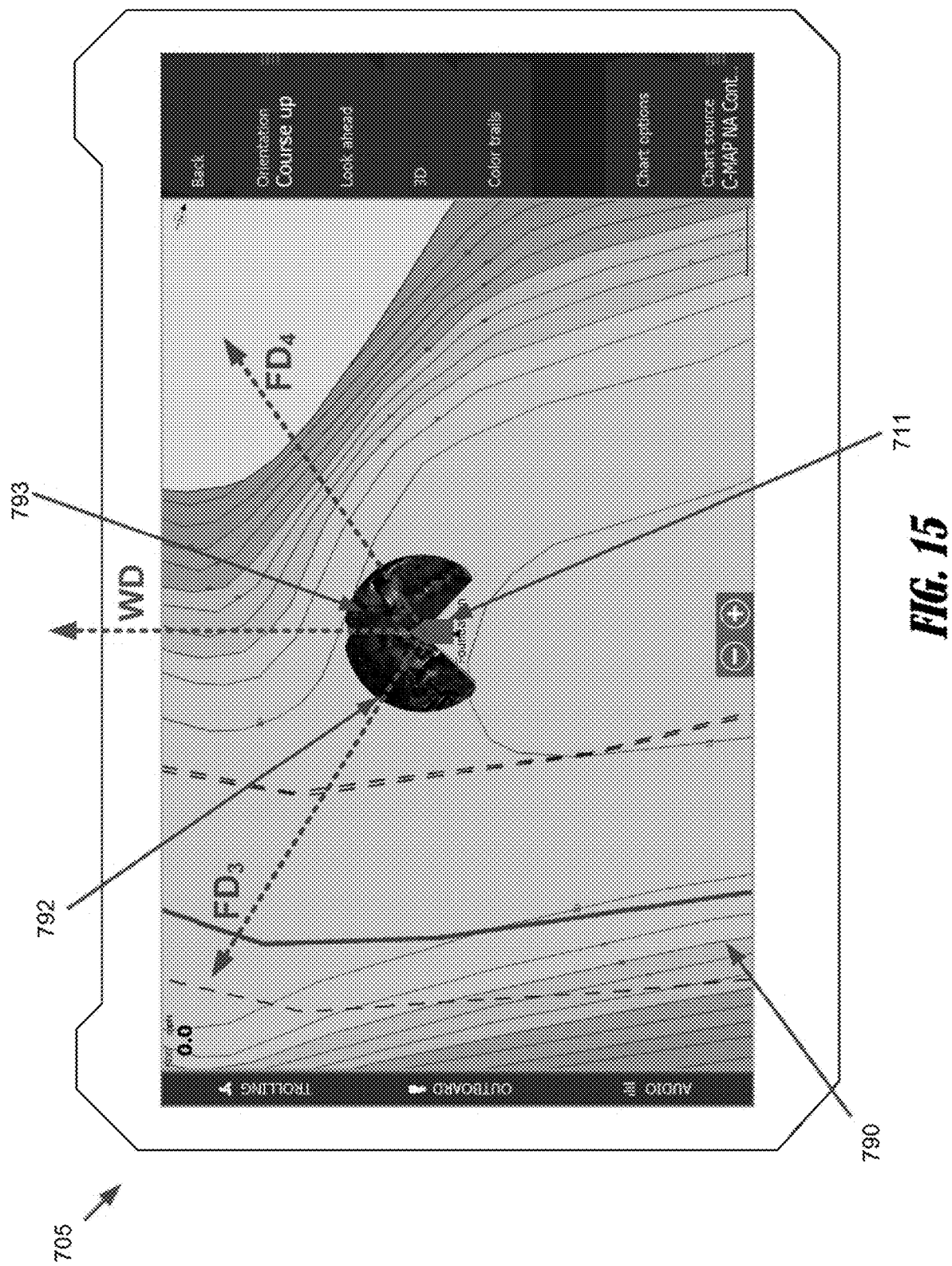
Figure 16:
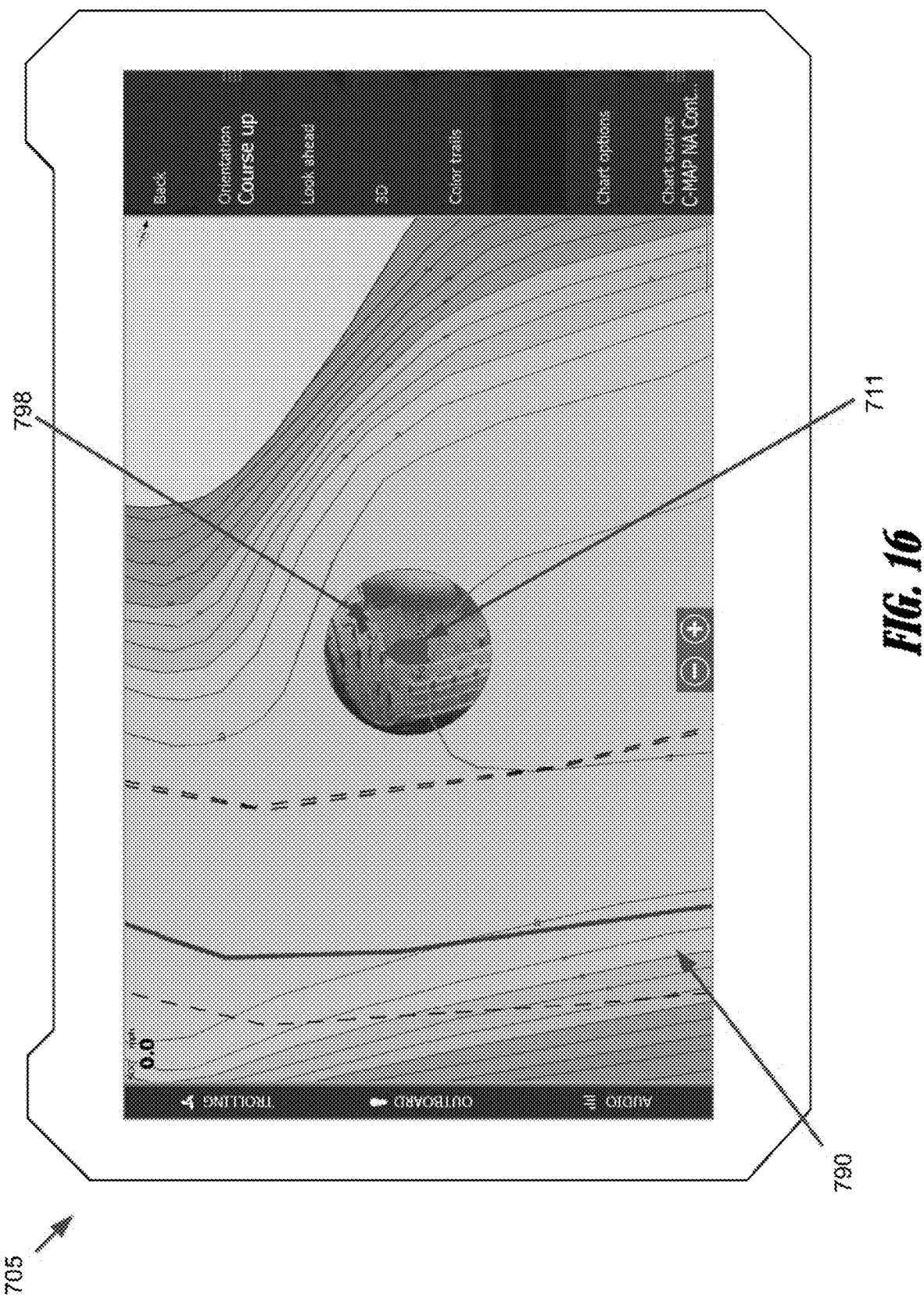
Figure 17:
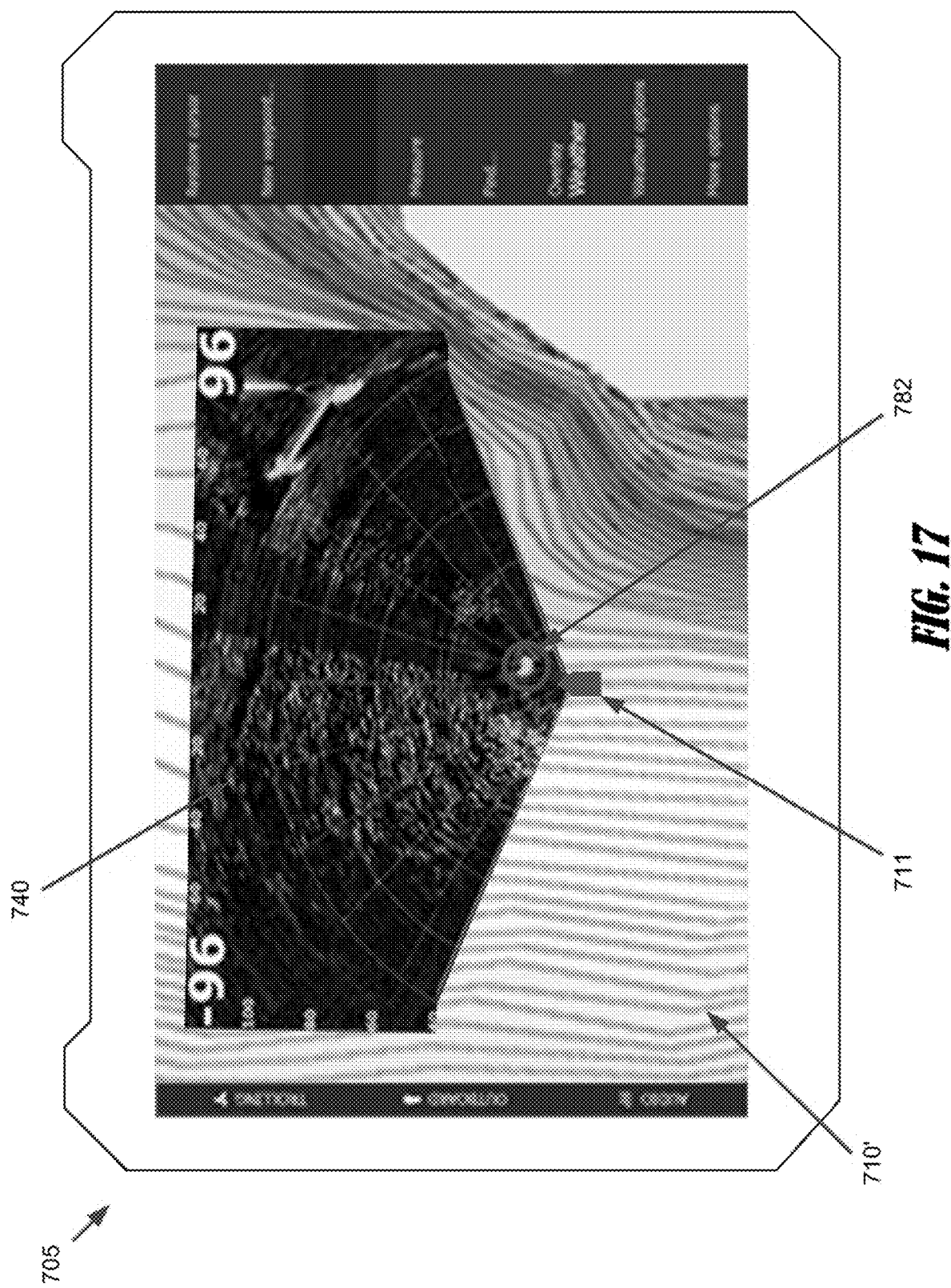
Figure 18:
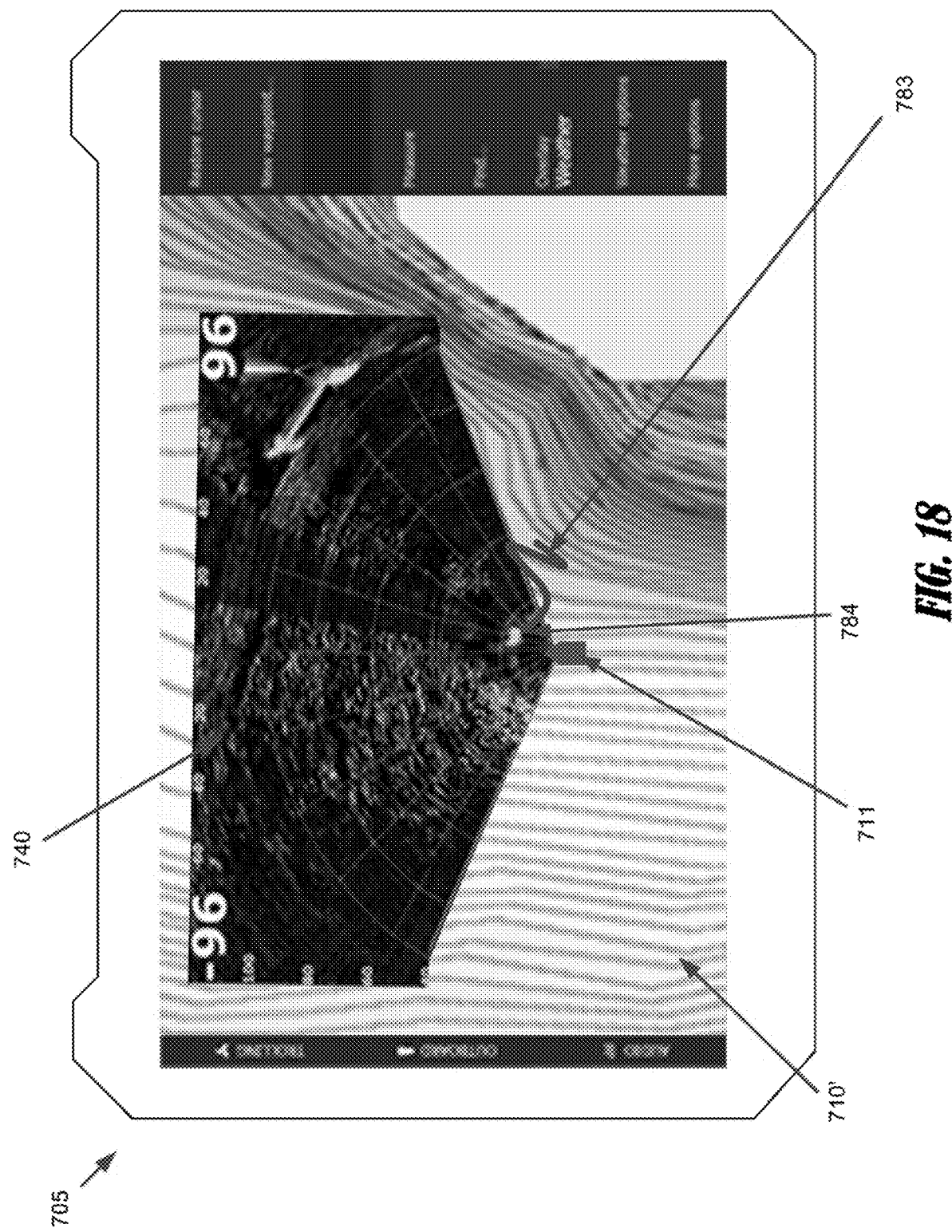
Figure 19:
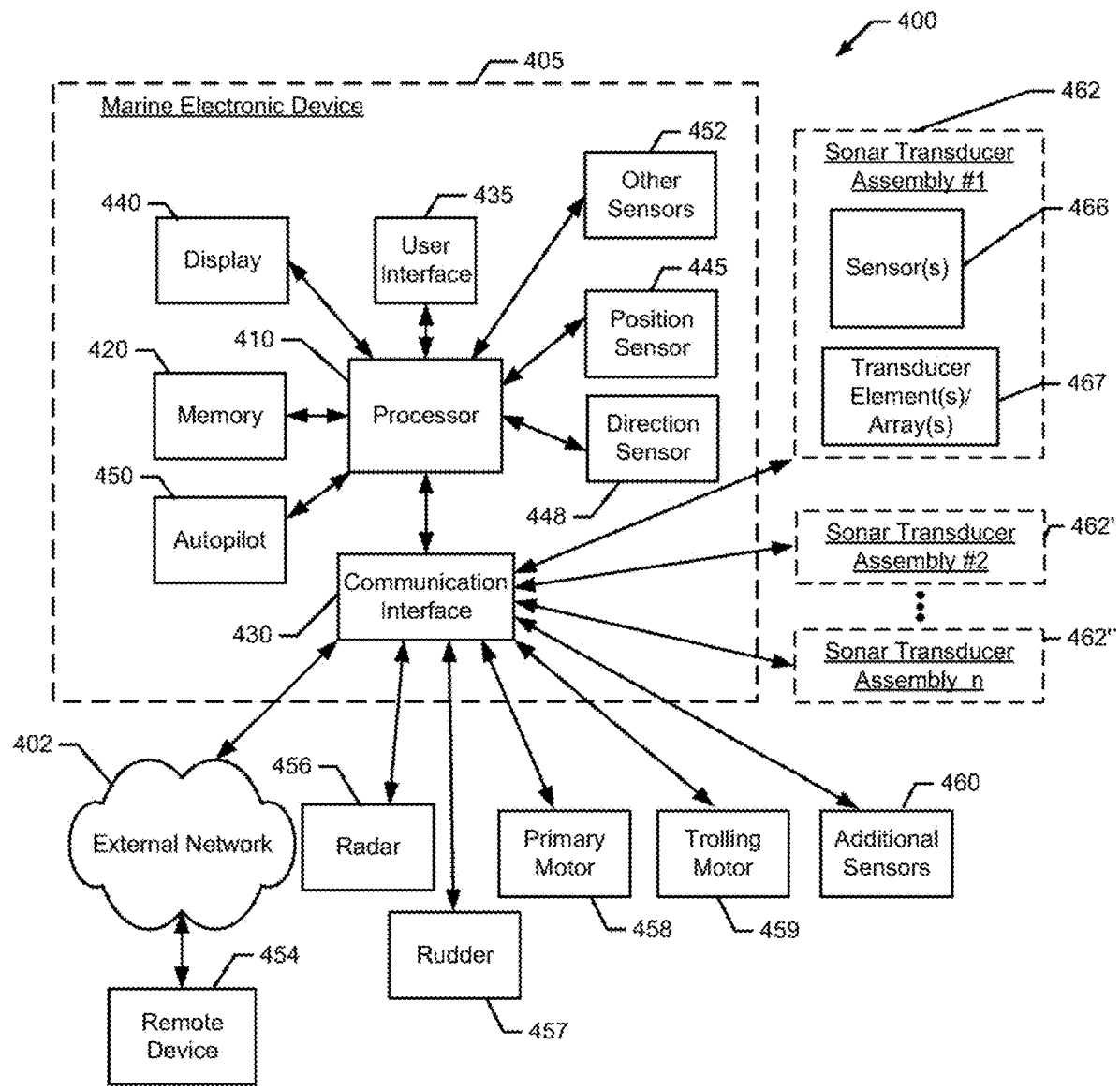
Figure 20:
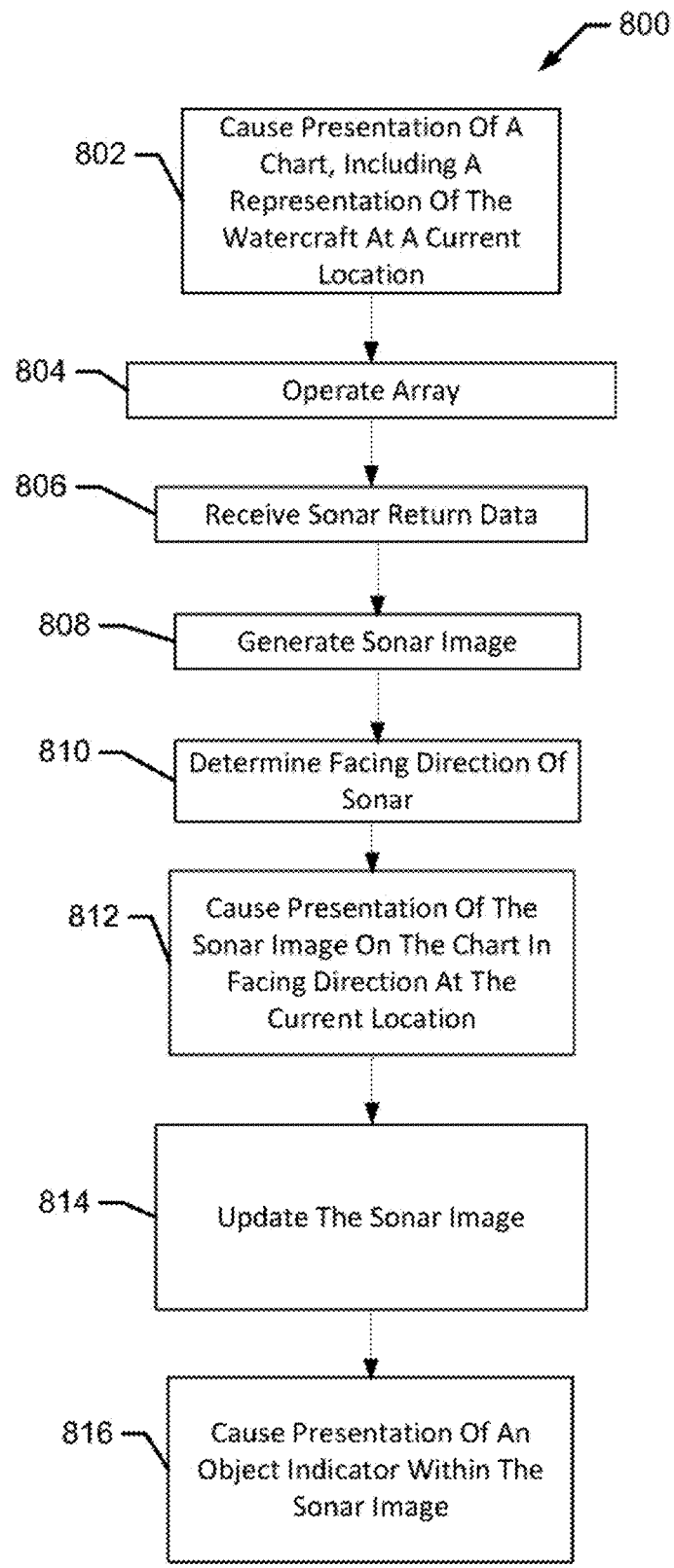

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3 illustrates three example arrays arranged to provide continuous sonar coverage utilizing beamformed sonar return beams, in accordance with some embodiments discussed herein;

FIG. 3A illustrates a first array shown in FIG. 3 along with its corresponding ranges of angles of beamformed sonar return beams, in accordance with some embodiments discussed herein;

FIG. 3B illustrates a second array shown in FIG. 3 along with its corresponding ranges of angles of beamformed sonar return beams, in accordance with some embodiments discussed herein;

FIG. 3C illustrates a third array shown in FIG. 3 along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5 shows a perspective view of an example transducer assembly that includes three arrays, in accordance with some embodiments discussed herein;

FIG. 6 shows an exploded view of the example transducer assembly shown in FIG. 5, in accordance with some embodiments discussed herein;

FIGS. 7A-B illustrate example mounting options for the example transducer assembly of FIG. 5 when mounted generally horizontally, in accordance with some embodiments discussed herein;

FIG. 8 illustrates a schematic top plan view of a watercraft with an example transducer assembly utilizing three arrays, wherein the transducer assembly is mounted generally horizontally to provide sonar coverage in the port-to-starboard direction in front of the watercraft, in accordance with some embodiments discussed herein;

FIG. 9 shows an example display presenting a two-dimensional (2D) live sonar image corresponding to the sonar coverage shown in FIG. 8, in accordance with some embodiments discussed herein;

FIG. 10 illustrates the example display presenting a chart with an example sonar image overlay at the corresponding current location of the watercraft and in the corresponding facing direction, in accordance with some embodiments discussed herein;

FIG. 11 illustrates the example display presenting the chart with the example sonar image overlay shown in FIG. 10, wherein the zoom level of the chart has been increased from the zoom level shown in FIG. 10, in accordance with some embodiments discussed herein;

FIG. 12 illustrates the example display presenting the chart with another example sonar image overlay, wherein the facing direction of the sonar system changed with respect to the watercraft, in accordance with some embodiments discussed herein;

FIG. 13 illustrates the example display presenting the chart with the example sonar image overlay from both FIGS. 10 and 12, wherein the sonar image overlay from FIG. 12 is presented above the sonar image overlay from FIG. 10, in accordance with some embodiments discussed herein;

FIG. 14 illustrates the example display presenting the chart with the example sonar image overlays from FIG. 13, wherein the sonar image overlay from FIG. 10 is faded with respect to the sonar image overlay from FIG. 12, in accordance with some embodiments discussed herein;

FIG. 15 illustrates the example display presenting a chart with two example sonar image overlays that work together to provide increased coverage around the watercraft, in accordance with some embodiments discussed herein;

FIG. 16 illustrates the example display presenting the chart shown in FIG. 15 with a 360° sonar image overlay, in accordance with some embodiments discussed herein;

FIG. 17 illustrates the example display presenting the chart with the sonar image overlay shown in FIG. 11, wherein an indicator of an object within the sonar image is presented within the sonar image, in accordance with some embodiments discussed herein;

FIG. 18 illustrates the example display presenting the chart with the sonar image overlay shown in FIG. 11, wherein a trail illustrating historical positions of an object within the sonar image is presented within the sonar image, in accordance with some embodiments discussed herein;

FIG. 19 illustrates a block diagram of an example system with various electronic devices, marine devices, and secondary devices shown, in accordance with some embodiments discussed herein; and FIG. 20 illustrates a flowchart of an example method of presenting a sonar image over a chart, in accordance with some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102a, 102b, and 102c disposed on and/or proximate to the watercraft. Notably, example watercraft contemplated herein may be surface watercraft, submersible watercraft, or any other implementation known to those skilled in the art. The transducer assemblies 102a, 102b, and 102c may each include one or more transducer elements configured to transmit sound waves into a body of water, receive sonar returns from the body of water, and convert the sonar returns into sonar return data. Various types of sonar transducers may be utilized—for example, a linear downscan sonar transducer, a conical downscan sonar transducer, a sidescan sonar transducer, and/or one or more arrays of a plurality of sonar transducer elements.

In this regard, the sonar transducer may be formed of one or more active elements (e.g., piezoelectric crystals). Wires are soldered to coatings on the active element and can be attached to a cable which transfers the electrical energy from a transmitter to the active element. As an example, when the frequency of the electrical signal is the same as the mechanical resonant frequency of the active element, the active element moves, creating sound waves at that frequency. The shape of the active element determines both its resonant frequency and shape of the sonar beam. Further, padding can be used to prevent sonar emissions from certain faces of the active element (e.g., the top and sides) leaving exposed only the emitting faces for which the sonar beam is desired. Frequencies used by sonar devices vary, and some sonar transducers may produce sonar beams at multiple different frequencies. Some example sonar transducers utilize a frequency range from 50 KHz to over 900 KHz depending on application. Some sonar systems vary the frequency within each sonar pulse using "chirp" technology.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c. Other mounting configurations are contemplated also, such as may enable rotation of the transducer assembly (e.g., mechanical and/or manual rotation, such as on a rod or other mounting connection).

The watercraft 100 may also include one or more marine electronic devices 160, such as may be utilized by a user to interact with, view, or otherwise control various functionality regarding the watercraft, including, for example, nautical charts and various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a remote device (such as a user's mobile device) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Another example device on the watercraft 100 includes a temperature sensor 112 that may be positioned so that it will rest within or outside of the body of water 101. Other example devices include a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110.

Some example embodiments of the present invention utilize sonar transducer assemblies that provide for generating near real-time (e.g., "live") sonar imagery. In this regard, in some embodiments, the entire sonar image is continuously updated all at once (e.g., as opposed to building up historical slices of sonar data as is typical of conventional downscan or sidescan sonar images). The example transducer assembly described with respect to FIGS. 2A-8 provides an example transducer assembly that can be used to form the live sonar imagery. Notably, however, other transducer assembly configurations can also be used to form live sonar imagery and embodiments of the present invention are not necessarily meant to be limited to a specific transducer assembly. For example, more or less arrays or elements within the arrays may be used, different transducer element configurations may be used, multiple sonar transducer assemblies can be used, etc.

FIGS. 2A-C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the transducer array 220 includes an emitting face 221 with a length LA and a width WA, where the length is greater than the width. Within the array 220, each transducer element 208 defines an emitting face 209 with a length LT and a width WT, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, $\pi/2$ radian, $\pi/4$ radian, or $\pi/8$ radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.5° to 1°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291a and 291b). Likewise, the sonar return beams can be "steered" within the second range of angles 282 based on varying the frequency (e.g., between 292a and 292b). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction $D_{FD}$ of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5° to 1° are formed. Further, with reference to FIG. 2C, a transverse beamwidth $\theta_3$ of ~20° is formed (although other transverse beamwidths are contemplated such as between ~9° and 27°). Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3 illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3A), is oriented with a facing direction (e.g., substantially straight down relative to the figure) so as to produce a first range of angles 341 and a second range of angles 342 (with a gap in between). The second array 330 (shown by itself in FIG. 3B), is oriented with a facing direction at an angle (e.g., −22.5° relative to the facing direction of the first array 340) so as to produce a first range of angles 331 and a second range of angles 332 (with a gap in between). The third array 320 (shown by itself in FIG. 3C), is oriented with a facing direction at another angle (e.g., −45° relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for ~135°, although other overall coverage angles are contemplated such as angles ranging from 90°-140°.

FIG. 4 illustrates another example transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the transducer assembly 310 of FIG. 3, the second array 530 of the transducer assembly 510 has been shifted (e.g., offset) while maintaining its relative angle orientation (e.g., it is still mounted with a facing direction at an angle (e.g., −22.5°) relative to the facing direction of the first array—just as in the transducer assembly 310). Thus, the transducer assembly 510 forms an "X" configuration for the first array 540 and the third array 520, but also has a line "_" at the bottom of the "X" corresponding to the second array 530. Notably, the same relative continuous sonar beam coverage is obtained (e.g., as the small relative shift from the centerpoint 315 in FIG. 3 does not significantly change the resulting beam coverage—particularly with respect to the distance covered in the underwater environment). For explanatory purposes, the various ranges of angles are shown extending from a slightly revised centerpoint 515.

FIG. 5 illustrates an example transducer assembly 602 including a housing 605 that houses the three arrays 620, 630, 640 (which are shown in exploded view in FIG. 6). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X plus line configuration of the arrays enables some benefits for the transducer assembly 602. For example, the housing 605 of the transducer assembly 602 may maintain a small footprint and still provide a straight bottom that enables a user to more easily comprehend the position of the center array (and, thus, determine and orient the transducer assembly 602 properly with respect to the watercraft for the desired coverage). With reference to FIG. 6, the PCB 609 and the electrical connectors 603 are also shown for electrically connecting the arrays 620, 630, and 640.

Though shown mounted in FIGS. 3 and 4 so that the resulting sonar coverage is forward (left side) and downward, with the wide beam angle of ~135° extending in the vertical plane, other orientations are contemplated. For example, in some embodiments, the transducer assembly may be oriented in a generally horizontal direction to cause the wide beam angle (e.g., ~135°) to extend in a generally horizontal plane, such as may correspond with the water surface. Such an orientation provides a wider live sonar image in the horizontal plane extending from the watercraft and may be preferred for understanding positions of objects within the water (e.g., cast the fishing line 5° off the bow on the starboard side) and/or distances of objects from the watercraft (e.g., the fish school is 15 feet from the watercraft).

FIGS. 7A-B illustrate example mounting orientations for the transducer assembly shown in FIG. 5. For example, FIG. 7A illustrates the transducer assembly 902 mounted to a pole 910 (e.g., a shaft of a trolling motor) using a mounting arm 906. The mounting arm 906 attaches via a fastener to the transducer assembly 902 at a first end 907 and to the pole 910 via a clamp 908 at a second end 905. The mounting arm 906 includes a bend that enables the transducer assembly 902 to be spaced from the pole 910 and oriented as desired (e.g., facing generally horizontally along arrow J). FIG. 7B illustrates the transducer assembly 902 mounted to the trolling motor housing 912 via a strap and clamp 904. The transducer assembly 902 may be oriented as desired (e.g., facing generally horizontally along the arrow J).

FIG. 8 illustrates a watercraft 100 with an example transducer assembly 502 utilizing three arrays to provide continuous sonar coverage 505 horizontally in the forward direction relative to the watercraft 100 (e.g., port-to-starboard). In this regard, the three arrays work together to provide corresponding ranges of angles 521, 522, 531, 532, 541, 542—similar to those shown and described with respect to FIG. 4. In the illustrated embodiments, the lengths of each of the emitting faces of the three arrays extends in the port-to-starboard direction of the watercraft. As indicated herein, the frequency of the sonar return beams can be varied to provide a sonar return beam 506 that can sweep (e.g., along arrow A) within the sonar beam coverage 505 (e.g., across the three arrays)—to capture sonar return signals along the sonar beam coverage. With such an example set-up, the resulting 2D live sonar image would show a live (or near real-time) sonar image corresponding to the volume extending in front of the watercraft according to the beam coverage (although in some embodiments the transducer assembly may have a facing direction that is different than forward and/or rotatable with respect to the watercraft).

In some embodiments, the transducer assembly can be used to form a live (or substantially real-time) two-dimensional (2D) sonar image (e.g., time/distance from the transducer assembly and angle) with a horizontal view. For example, FIG. 9 illustrates a live 2D sonar image 720 presented on a display 705 (e.g., of a marine electronics device). The live 2D sonar image 720 is formed as slices of sonar return data corresponding to each sonar return beam 706 extending within that sonar beam coverage extending from the transducer assembly location 721. For example, the sonar return beam 706 may extend at different angles, such as along the arrow B. Overall, however, the sonar return beams 706 may add up to form an overall coverage angle $\theta_4$. Notably, the sonar image 720 may be formed with a radial distance $D_{RSI}$ that corresponds to an effective sonar return distance (e.g., a distance that corresponds to desirably accurate sonar returns from the emitting face of the transducer assembly). The live 2D sonar image 720 can be updated in substantially real-time all at once as the sonar return beams 706 are all received at substantially the same time (e.g., by selecting different frequencies to form all the different sonar return beams that are used to present sonar return data into the image at the proper angle). The detailed bottom surface is shown at 729.

Due to the overall coverage angle being ~135°, there are blank spaces in each corner 723a, 723b (as the display is shaped as a rectangle). Notably, the shape of the sonar image may be different depending on the effective coverage provided by the sonar transducer assembly. In this regard, in some embodiments, the live sonar image is shaped to provide imagery of the sonar return data all at once, and that sonar return data is continuously updated such that the imagery is continuously updated.

Whether a novice or an expert, it would be beneficial to be able to quickly and easily visually appreciate the real-world sonar coverage of a sonar image, such as a live sonar image. Indeed, even for experts, it can be difficult (or mentally consuming) to determine the real-world sonar coverage of a sonar transducer of a watercraft, such as figuring out where objects in the sonar imagery are actually in the real-world. Some embodiments of the present invention aim to provide useful information that will aid the user in determining and understanding the sonar coverage of the underwater environment, such as by providing live sonar imagery on a chart in the proper location, orientation, and/or dimensional spacing.

FIGS. 10-18 illustrate various rendering (e.g., presentation) of sonar images and nautical charts on a user interface display, such as display 440 as referenced in FIG. 19. Also referencing FIG. 19, a processor 410 may be configured to receive location data from the position sensor 445, such as a global positioning system (GPS) sensor. The processor 410 may determine a location, e.g. geographical location, based on the location data and correlate the geographic location with a corresponding chart location in the nautical chart. Referring to FIG. 10, the processor 410 may render the nautical chart 710 on display 705, which may include an indication of a vessel location (e.g., presentation of a representation of a watercraft 711) in an instance in which the displayed portion of the nautical chart 710 includes the chart location associated with the determined geographical location. Chart data associated with the nautical chart 710 may be stored in a memory, such as, referring back to FIG. 19, the memory 420 or remote device 454, from which the processor 410 may retrieve the chart data as necessary for rendering to the display 440.

The processor 410 may also be configured to receive sonar return data in response to the one or more sonar signals being transmitted into the body of water 101. As discussed above, the processor 410 may be configured to generate one or more sonar images based on the one or more sonar returns. The processor 410 may determine a location associated with the sonar return data based on location data received by the position sensor 445 at the time in which the sonar returns were received by the one or more transducer assemblies 102a, 102b, 102c (e.g., one or more of sonar transducer assemblies 462, 462', 462" in FIG. 19). The processor 410 may be configured to correlate the corresponding sonar return data (from the sonar returns) and/or the location data in real time such as by adding location data to the sonar return data and/or sonar image data, or by correlation of time stamps included in the location data and the sonar return data or sonar images. The sonar images may include, without limitation, sidescan 2D sonar images, 3D downscan sonar images, 3D sonar images, 2D and/or 3D live (e.g. real time or near real time) sonar images, or the like. The processor 410 may be configured to render the sonar images on the display 440 in real time or near real time, and/or store the sonar images and corresponding location information in a memory, such as the memory 420 or the remote device 454.

In some embodiments, the system may be configured to cause presentation of a chart (e.g., nautical chart) on a display, along with a representation of the watercraft at a current location within the chart. The chart may be stored in memory and/or gathered via an external or internal network. The position and/or orientation of the watercraft may be determined via position/orientation data, such as from a global positioning system (GPS) and/or other source(s). Returning to FIG. 10, an example display 705 (e.g., the display 440 of the marine electronic device 405 shown in FIG. 19) is presenting a chart 710. The chart 710 includes a representation of the watercraft 711 at a current location within the chart (e.g., such as may be determined based on position data). As illustrated, the representation of the watercraft 711 may have a relative size, such as may correspond to the zoom level of the chart 710, and a direction that indicates in which direction the watercraft 711 is pointing (e.g., such as may be based on orientation data and/or recent/current position data). The body of water may be illustrated as 712, such as in comparison to land, which is illustrated as 714. The chart 710 may also include depth readings and/or contour lines, such as may be pre-stored and/or may be updated based on various incoming data (e.g., tidal data, sonar data, satellite data, etc.).

In some embodiments, the system may be configured to operate one or more sonar transducer assemblies associated with the watercraft. For example, the system may be configured to operate one or more arrays of a plurality of sonar transducer elements, such as from the sonar transducer assembly 602 shown in FIG. 5. Accordingly, the system may cause one or more sonar transducer assemblies associated with the watercraft to transmit sonar beams into the underwater environment and receive sonar returns therefrom (forming sonar return data). Accordingly, the system may be configured to receive the sonar return data, such as from the operated array. In some embodiments, the system may be configured to generate one or more sonar images, such as from the received sonar return data. An example sonar image is a two-dimensional live sonar image, such as shown in and described with respect to FIG. 9. Notably, any type of sonar transducer assembly and corresponding sonar image is contemplated by various embodiments of the present invention.

In some embodiments, the system may be configured to determine the facing direction of the sonar transducer assembly. In some embodiments, direction data (e.g., orientation data, compass data, etc.) may be determined regarding at least one of the watercraft or the sonar transducer assembly. For example, the relative facing direction of the sonar transducer assembly with respect to the watercraft may be known and fixed (e.g., forward, rearward, 10° port of forward, etc.). In that case, the facing direction may be determined by determining the direction the watercraft is facing and then extracting out the facing direction of the sonar transducer assembly. In some cases, however, the sonar transducer assembly may have its own sensor for determining the facing direction (e.g., a direction sensor, GPS, orientation sensor, etc.) and the facing direction may be determined based on that data. Alternatively, the facing direction may be determined in other ways, such as being inputted by a user. FIG. 10 illustrates that the sonar transducer assembly utilized to generate the sonar image 740 has a facing direction $FD_1$ that is aligned with the forward direction of the watercraft. This corresponds to a sonar beam direction icon 744 that may be presented within the sonar image 740 itself (which illustrates the relative direction the sonar beam is facing with respect to the watercraft at the time of receipt of the sonar returns that resulted in the sonar image).

In some embodiments, the system is configured to cause, on the display, presentation of the sonar image in the facing direction on the chart and relative to the representation of the watercraft. In this regard, the sonar image is presented in the facing direction on the chart so as to provide live sonar imagery on the chart to visually provide a relationship between objects within the live sonar imagery and a real-world position of the objects. Referring to FIG. 10, the sonar image 740 is presented in the facing direction $FD_1$ corresponding to the facing direction of the sonar transducer assembly that was utilized to generate the sonar image 740. Accordingly, the sonar image 740 extends forward of the representation of the watercraft 711. Additionally, the angle of coverage $\theta_4$ corresponds to the overall sonar coverage angle of the sonar beams received by the sonar transducer assembly. In the sonar image 740, depth (or distance) readings are provided (although some sonar images may not include depth or distance readings). In some embodiments, user input may be provided (such as to the menu 718) to cause presentation of the sonar image on the chart and/or other functionality.

In some embodiments, the radial distance of the sonar image (e.g., radial distance $D_{RSI}$ in FIG. 9) may be utilized to adjust the distance $D_{RC}$ the sonar image 740 extends when presented on the chart 710 such that the presentation of the sonar image 740 on the chart 710 dimensionally corresponds to the actual sonar coverage offered by the sonar transducer assembly. In some embodiments, the sonar transducer assembly may be aimed to emit sonar beams in a generally horizontal plane, such as parallel (or generally parallel) to the surface of the body of water. Accordingly, the resulting sonar image and the distance measurements therein (e.g., based on time of flight of the sonar returns) may correlate with real-world distance in the horizontal plane (e.g., that can be illustrated on the flat chart). In this regard, a user can accurately determine the real-world position of objects visible in the sonar image 740. For example, the user may be able to tell that there is a sunken boat off to the forward and starboard side and may even be able to utilize real-world markers (such as noted in the chart—e.g., a buoy) to mentally envision or determine the position of the sunken boat.

In some embodiments, the sonar image may be generated and/or presented to remove any unnecessary or unused space (e.g., so as to not detract from the view of the chart itself). For example, the blank corners 723a, 723b of the sonar image 720 may be removed prior to presentation of the sonar image on the chart. In this regard, only the active sonar imagery is shown on the chart. In some embodiments, only a portion of the sonar image may be shown depending on the desired view (e.g., to form a certain view angle for example).

As noted above, in some embodiments, the sonar image may be a live sonar image. In this regard, in some such embodiments, the sonar image 740 may be updated in real-time while being presented on the chart.

In addition to making it easier to determine real-world positions of objects within the sonar image, utilizing this feature enables a reduction of the number of images that are displayed (e.g., a normal split-screen chart and sonar view may be replaced with a single larger chart view with the sonar image presented thereon). In some embodiments, various navigation and other chart features may be presented along with the sonar image on the chart.

In some embodiments, the relative position of the sonar transducer on the watercraft may be accounted for when forming and/or presenting the sonar image. In this regard, a sonar image from a sonar transducer assembly positioned near the front of the watercraft (e.g., mounted to the front of the watercraft, mounted to a trolling motor positioned on the front of the watercraft, etc.) may extend from a point on the representation of the watercraft near the front. Likewise, a sonar image from a sonar transducer assembly positioned near the rear of the watercraft (e.g., mounted to the rear of the watercraft, mounted to a trolling motor positioned on the rear of the watercraft, etc.) may extend from a point on the representation of the watercraft near the rear. Other relative positions are also contemplated. In some embodiments, position data associated with the sonar transducer assembly may be utilized directly form the sonar transducer assembly (e.g., as opposed to from the watercraft) to determine where to position the sonar image on the chart. In some embodiments, the relative position of the sonar transducer on the watercraft may be known (or inputted), which can be used to position the sonar image on the chart relative to the representation of the watercraft.

In some embodiments, the system may account for the zoom level of the chart when determining and/or presenting the sonar image. For example, with reference to FIG. 11, the chart 710' has been zoomed in on. Accordingly, the relative size of the representation of the watercraft 711 has increased—such as with respect to that shown in FIG. 10. Additionally, the system has adjusted the relative size of the sonar image 740 to align with the increased zoom level. In this regard, the sonar image 740 has a corresponding increased distance $D_{RC'}$ on the chart 710'.

In some embodiments, the sonar transducer assembly may be rotatable with respect to the watercraft. For example, the sonar transducer assembly may be mounted to a trolling motor that is rotatable with respect to the watercraft. As another example, the sonar transducer assembly may be mounted to a rod or directly mounted to the watercraft in a manner that enables rotation (e.g., manually and/or mechanically). In some such embodiments, it may be desirable to provide a direction sensor (e.g., direction sensor, orientation sensor, etc.) with the sonar transducer assembly to enable detection of the facing direction of the sonar transducer assembly. Accordingly, in some embodiments, the system may be configured to re-orient the sonar image (such as with respect to the watercraft) based on the current facing direction. For example, FIG. 12 illustrates a new sonar image 741 that has rotated (e.g., along arrow C) along with the sonar transducer assembly with respect to the watercraft. In this regard, the sonar image is extending off to the port side of the representation of the watercraft 711 with a new facing direction $FD_2$ while the watercraft is still in the watercraft facing direction WD.

In some embodiments, the system may be configured to leave presentation of a historical (past) sonar image on the chart while still presenting the current sonar image. In this regard, the user may build-up the sonar imagery. This may be useful for more fully mapping the underwater environment. Similarly, in the instance in which the sonar transducer assembly is rotatable with respect to the watercraft, the user may build up a desired view, such as a 360° view. As an example, FIG. 13 illustrates the presentation of the prior sonar image 740 (facing forward with respect to the watercraft) and the current sonar image 741 (facing in the direction FD$_2$). By leaving up the prior sonar image 740, the user has a view of sonar imagery of a greater volume of the underwater environment around the watercraft (and the prior sonar imagery may not be that old—e.g., generated a few seconds prior). If the user continues to rotate the sonar transducer assembly (or the sonar transducer assembly may be automatically rotated, such as according to a scan pattern), a 360° view may be acquired (although other scan patterns and views are contemplated).

In some embodiments, the prior sonar images may be altered, such as to distinguish them from the current sonar image. For example, as time passes with the sonar image on the screen, it may fade away (e.g., become more and more transparent). In some embodiments, one or more time thresholds could be passed to cause the sonar image to change transparency. In some embodiments, the transparency could gradually change as time passes—increasing until it is no longer visible. As an example, FIG. 14 illustrates that the prior sonar image (now 740°) has faded with respect to the current sonar image 741. Additionally or alternatively, other visualization distinguishing features may be utilized (e.g., different colors, different color patterns, different sizes, etc.) and/or other reasons to distinguish the images (e.g., besides passage of time) may be utilized (e.g., selection by the user).

In some embodiments, the system may include one or more additional sonar transducer assemblies or arrays. Such additional sonar transducer assemblies or arrays may be formed of any configuration of sonar transducer elements. For example, the watercraft may include other types of sonar transducer assemblies, such as downscan transducer elements (traditional and/or linear), sidescan transducer elements, or other arrays of transducer elements. In some embodiments, the system may be configured to generate and present corresponding sonar images on the chart, such as in the proper orientation and at the proper location. In some embodiments, multiple sonar images may be presented on the chart simultaneously.

In some embodiments, the additional sonar transducer assemblies or arrays may be aimed in a different facing direction than the first sonar transducer assembly. In some such embodiments, the multiple sonar images may be presented on the chart at the same time, thereby providing a composite sonar image that covers a large section of the chart (and the underwater environment). For example, a first sonar image may define a first coverage area (with a first overall coverage angle) in a horizontal plane extending outwardly from the watercraft and a second sonar image may define a second coverage area (with a second overall coverage angle) in the horizontal plane extending outwardly from the watercraft, where the first coverage area is different than the second coverage area. In some embodiments, the coverage areas may be configured so as to not overlap.

In some embodiments, the multiple sonar transducer assemblies or arrays may be positioned (e.g., and mounted) and aimed to coordinate together to form a desirable coverage area. For example, two sonar transducer assemblies with a similar configuration may be aimed in different facing directions, but be compliments to each other such that the two sonar coverage areas are positioned to form a continuous composite sonar coverage area. Such a continuous composite sonar coverage area may, for example, cover an angle range extending from the watercraft (e.g., 240°, 360°, or some other degree range). For example, FIG. 15 illustrates a chart 790 being presented on a display 705. A representation of the watercraft 711 is presented and is oriented in a direction WD. A first sonar transducer assembly is aimed in a first facing direction FD$_3$ off to the port side of the watercraft and is used to generate the first sonar image 792, which is presented on the chart. A second sonar transducer assembly is aimed in a second facing direction FD$_4$ off to the starboard side of the watercraft and is used to generate the second sonar image 793, which is presented on the chart. Notably, each sonar image has a sonar coverage angle of about 135°. Accordingly, the sonar transducer assemblies are aimed such that the right side of the first sonar image 792 abuts the left side of the second sonar image 793, which also happens to be occurring in the direction the watercraft is facing WD. This forms a sonar coverage angle of 270° around the watercraft. Notably, in the illustrated embodiment, the sonar image provides live sonar imagery, giving the user a live image in a large coverage area around the watercraft. In some embodiments, the two sonar transducer assemblies may be rotatable with respect to the watercraft to enable rotation of the sonar image on the chart (as described above). In some embodiments, one or more of the sonar transducer assemblies may be independently rotatable to enable greater flexibility in sonar coverage, such as via user control and/or according to automatic scan patterns.

In some embodiments, the sonar system may be designed to provide 360° coverage around the watercraft. For example, multiple arrays and/or multiple sonar transducer assemblies may be arranged in appropriate facing directions and have appropriate sonar coverage to enable the full 360° view. In some examples, the resulting sonar image may include live sonar imagery over the entire coverage area. Additionally or alternatively, as described herein, in some embodiments, the 360 sonar image may be built up as the one or more sonar transducer assemblies or arrays rotate about the watercraft. FIG. 16 illustrates an example sonar image 798 that provides 360° sonar coverage around the watercraft.

In some embodiments, the system may be configured to determine a position of an object within sonar imagery and present an indication of the object in the relative position within the sonar image (e.g., highlight the object, present a trail of movement of the object, etc.). In this regard, the system may be configured to provide a user with a real-world position indication of an object that is presented in the sonar imagery.

In some embodiments, the system may be configured to determine an object within sonar imagery. For example, a user may select the representation of the object within the sonar imagery (e.g., select a fish in the sonar image—although other objects are contemplated, such as structure, fish schools, etc.). Additionally or alternatively, the system may select the object, such as based on various criteria (e.g., signal strength, clustering of sonar returns, etc.).

Once determined, the system may be configured to determine the position of the object within the sonar image. In some embodiments, determining the position of the object within the sonar image may include filtering or other processing to determine the object and its corresponding position (e.g., distance from the transducer, angle, etc.). Then, the corresponding pixel location within the sonar image may be determined. Such position determination may occur using various different data inputs. For example, the subject sonar transducer may enable such a determination (e.g., using a sonar transducer array and interferometry, beamforming, etc.). Additionally or alternatively, other sonar transducers or data sources may be utilized. In some embodiments, stored data may be used to determine a position of an object within the sonar image.

The system may then be configured to present an indicator within the sonar image corresponding to the object. For example, FIG. 17 includes an indicator 782 of a circle around the object within the sonar image 740. In such an example, if the indicator 275 corresponds to a fish, the user would know that the object was in the general forward and slightly starboard side of the watercraft and within about 18 feet of the watercraft. While the illustrated embodiment provides a circle as the indicator, other indicators are contemplated for presentation. For example, highlighting, a fish icon, coloring, transparency, or other image alterations may be presented instead of or in addition to a circle.

In some embodiments, the system may be configured to track the object as additional sonar data is captured. In this regard, in some embodiments, the indicator may move around with the object as the object moves within the sonar image (or the sonar image position moves with respect to the object). In some embodiments, the system may be configured to present the indicator as a trail that shows historical positions of the object in the real-world. In this regard, the position of the object on the chart may be maintained in memory as new sonar imagery is acquired. Accordingly, the trail may provide an indication of those positions over a period time. Various configurations of the trail feature may be customized (e.g., the number of objects for including trails, the length of the period of time for presentation of the trail, how the trail is presented, etc.). FIG. 18 illustrates an example trail 783 showing historical positions of the object on the chart 710' extending from the current position of the object 784 within the sonar image 740.

Example Architecture

FIG. 19 illustrates a block diagram of an example system 400 according to various embodiments of the present invention described herein. The illustrated system 400 includes a marine electronic device 405. The system 400 may comprise numerous marine devices. As shown in FIG. 19, one or more sonar transducer assemblies 462 may be provided. A radar 456, a rudder 457, a primary motor 458, a trolling motor 459, and additional sensors/devices 460 may also be provided as marine devices, but other marine devices may be provided as well. One or more marine devices may be implemented on the marine electronic device 405. For example, a position sensor 445, a direction sensor 448, an autopilot 450, and other sensors 452 may be provided within the marine electronic device 405. These marine devices can be integrated within the marine electronic device 405, integrated on a watercraft at another location and connected to the marine electronic device 405, and/or the marine devices may be implemented at a remote device 454 in some embodiments. The system 400 may include any number of different systems, modules, or components; each of which may comprise any device or means embodied in either hardware, software, or a combination of hardware and software configured to perform one or more corresponding functions described herein.

The marine electronic device 405 may include at least one processor 410, a memory 420, a communication interface 430, a user interface 435, a display 440, autopilot 450, and one or more sensors (e.g. position sensor 445, direction sensor 448, other sensors 452). One or more of the components of the marine electronic device 405 may be located within a housing or could be separated into multiple different housings (e.g., be remotely located).

The processor(s) 410 may be any means configured to execute various programmed operations or instructions stored in a memory device (e.g., memory 420) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 410 as described herein. For example, the at least one processor 410 may be configured to analyze sonar return data for various features/functions described herein (e.g., generate a sonar image, determine an object and/or object position, etc.).

In some embodiments, the at least one processor 410 may be further configured to implement signal processing. In some embodiments, the at least one processor 410 may be configured to perform enhancement features to improve the display characteristics of data or images, collect or process additional data, such as time, temperature, GPS information, waypoint designations, or others, or may filter extraneous data to better analyze the collected data. The at least one processor 410 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 420 may include one or more non-transitory storage or memory devices such as, for example, volatile and/or non-volatile memory that may be either fixed or removable. The memory 420 may be configured to store instructions, computer program code, sonar data, and additional data such as radar data, chart data, location/position data in a non-transitory computer readable medium for use, such as by the at least one processor 410 for enabling the marine electronic device 405 to carry out various functions in accordance with example embodiments of the present invention. For example, the memory 420 could be configured to buffer input data for processing by the at least one processor 410. Additionally or alternatively, the memory 420 could be configured to store instructions for execution by the at least one processor 410.

The communication interface 430 may be configured to enable communication to external systems (e.g. an external network 402). In this manner, the marine electronic device 405 may retrieve stored data from a remote device 454 via the external network 402 in addition to or as an alternative to the onboard memory 420. Additionally or alternatively, the marine electronic device 405 may transmit or receive data, such as sonar signal data, sonar return data, sonar image data, or the like to or from a sonar transducer assembly 462. In some embodiments, the marine electronic device 405 may also be configured to communicate with other devices or systems (such as through the external network 402 or through other communication networks, such as described herein). For example, the marine electronic device 405 may communicate with a propulsion system of the watercraft 100 (e.g., for autopilot control); a remote device (e.g., a user's mobile device, a handheld remote, etc.); or another system. Using the external network 402, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 402, and the data may instead be communicated using other approaches, such as through a physical or wireless connection via the communications interface 430.

The communications interface 430 of the marine electronic device 405 may also include one or more communications modules configured to communicate with one another in any of a number of different manners including, for example, via a network. In this regard, the communications interface 430 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 400.

The position sensor 445 may be configured to determine the current position and/or location of the marine electronic device 405 (and/or the watercraft 100). For example, the position sensor 445 may comprise a GPS, bottom contour, inertial navigation system, such as machined electromagnetic sensor (MEMS), a ring laser gyroscope, or other location detection system. Alternatively or in addition to determining the location of the marine electronic device 405 or the watercraft 100, the position sensor 445 may also be configured to determine the position and/or orientation of an object outside of the watercraft 100.

The display 440 (e.g. one or more screens) may be configured to present images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In some embodiments, the display 440 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer assemblies 462 or from sonar devices positioned at other locations, such as remote from the watercraft. Additional data may be received from marine devices such as a radar 456, a primary motor 458 or an associated sensor, a trolling motor 459 or an associated sensor, an autopilot, a rudder 457 or an associated sensor, a position sensor 445, a direction sensor 448, other sensors 452, a remote device 454, onboard memory 420 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 19 is shown as being directly connected to the at least one processor 410 and within the marine electronic device 405, the display 440 could alternatively be remote from the at least one processor 410 and/or marine electronic device 405. Likewise, in some embodiments, the position sensor 445 and/or user interface 435 could be remote from the marine electronic device 405.

The marine electronic device 405 may include one or more other sensors/devices 452, such as configured to measure or sense various other conditions. The other sensors/devices 452 may include, for example, an air temperature sensor, a water temperature sensor, a current sensor, a light sensor, a wind sensor, a speed sensor, or the like.

The sonar transducer assemblies 462 illustrated in FIG. 19 may include one or more sonar transducer array(s) and/or elements 467, such as described herein. In some embodiments, additional separate sonar transducer elements (arranged to operate alone, in an array, or otherwise) may be included. The sonar transducer assemblies 462 may also include a sonar signal processor or other processor (although not shown) configured to perform various sonar processing. In some embodiments, the processor (e.g., at least one processor 410 in the marine electronic device 405, a controller (or processor portion) in the sonar transducer assemblies 462, or a remote controller—or combinations thereof) may be configured to filter sonar return data and/or selectively control transducer element(s) 467. For example, various processing devices (e.g., a multiplexer, a spectrum analyzer, A-to-D converter, etc.) may be utilized in controlling or filtering sonar return data and/or transmission of sonar signals from the transducer element(s) 467.

The sonar transducer assemblies 462 may also include one or more other systems, such as various sensor(s) 466. For example, the sonar transducer assembly 362 may include an orientation sensor, such as gyroscope or other orientation sensor (e.g., accelerometer, MEMS, direction, etc.) that can be configured to determine the relative orientation and/or direction of the sonar transducer assembly 462 and/or the one or more sonar transducer array(s) and/or element(s) 467—such as with respect to the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIG. 19 may be rearranged to alter the connections between components. For example, in some embodiments, a marine device outside of the marine electronic device 405, such as the radar 456, may be directly connected to the at least one processor 410 rather than being connected to the communication interface 430. Additionally, sensors and devices implemented within the marine electronic device 405 may be directly connected to the communications interface in some embodiments rather than being directly connected to the at least one processor 410.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIG. 20. FIG. 20 presents a flowchart with example method(s) of presenting a sonar image over a chart according to various embodiments described herein. These methods may be performed by a wide variety of components, including, but not limited to, one or more processors, one or more microprocessors, and one or more controllers. In some embodiments, a marine electronic device 405 (FIG. 19) may comprise one or more processors that perform the functions shown in FIG. 20. Further, these methods may be provided on a piece of software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a radar unit, watercraft, server, etc.

FIG. 20 is a flowchart of an example method 800 for presenting a sonar image over a chart, in accordance with some embodiments discussed herein. The operations illustrated in and described with respect to FIG. 20 may, for example, be performed by, with the assistance of, and/or under the control of one or more of the processor 410, memory 420, communication interface 430, user interface 435, position sensor 445, direction sensor 448, other sensor 452, autopilot 450, transducer assembly 462, 462', 462", display 440, radar 456, rudder 457, primary motor 458, trolling motor 459, additional sensors 460, and/or external network 402/remote device 454.

At operation 802, the method comprises causing presentation of a chart, including a representation of the watercraft at a current location within the chart. At operation 804, the method comprises operating an array of a plurality of elements of one or more transducer assemblies. At operation 806, the method comprises receiving sonar return data from the one or more transducer assemblies. At operation 808, the method comprises generating a sonar image, such as a live sonar image. Then, at operation 810, the method comprises determining a facing direction corresponding to the one or more transducer assemblies and/or the sonar image. At operation 812, the method comprises causing presentation of the sonar image on the chart in a facing direction at the current location for the watercraft.

In some embodiments, the method comprises, at operation 814, updating the sonar image.

In some embodiments, at operation 816, the method comprises causing presentation of an object indicator within the sonar image (which may include determining the object and/or tracking the object).

FIG. 20 illustrates a flowchart of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A system for presenting marine information, wherein the system comprises:
   at least one array of a plurality of sonar transducer elements associated with a watercraft on a body of water and oriented with an emitting face in a facing direction, wherein the plurality of sonar transducer elements are configured to operate at a fixed phase shift and vary in frequency so as to beamform multiple sonar return beams based on one or more sonar beams transmitted into the underwater environment;
   a display;
   one or more processors; and
   a memory including computer program code configured to, when executed, cause the one or more processors to:
      cause, on the display, presentation of a chart including at least a portion of the body of water;
      cause, on the display, presentation of a representation of the watercraft at a position on the chart corresponding to a current location of the watercraft;
      receive sonar return data from the plurality of sonar transducer elements of the at least one array;
      filter the sonar return data based on frequency to form the multiple sonar return beams that together form a coverage area in a horizontal plane extending outwardly from the watercraft, wherein the coverage area extends a radial distance outwardly from the emitting face;
      generate a sonar image of the underwater environment outward from the watercraft, wherein the sonar image is a two-dimensional live sonar image that is formed of the sonar return data from each of the multiple sonar return beams, and wherein the sonar return data used to form the two-dimensional live sonar image was received at substantially a same time by the plurality of sonar transducer elements, wherein the sonar return data used to form the two-dimensional live sonar image is updated in real-time;
determine the facing direction; and
cause, on the display, presentation of the sonar image in the facing direction on the chart and relative to the representation of the watercraft, wherein the sonar image extends outwardly from the representation of the watercraft on the chart a distance dimensionally corresponding to the radial distance of the coverage area to thereby visually indicate a real world coverage area of the two-dimensional live sonar image, wherein the sonar image is presented in the facing direction on the chart so as to visually provide a relationship between objects within the live sonar imagery and a real-world position of the objects.

2. The system of claim 1, wherein the computer program code is further configured to, when executed, cause the one or more processors to:
determine a zoom level of the chart being presented on the display; and
adjust a size of the sonar image based on the zoom level of the chart for presentation of the sonar image on the chart at the zoom level.

3. The system of claim 1, wherein the coverage area defines an overall coverage angle within the range of 90° to 140°.

4. The system of claim 1, wherein the at least one array is a first array, wherein the sonar image is a first sonar image, and wherein the corresponding facing direction of the first array is a first facing direction, wherein the system further includes a second array of a plurality of sonar transducer elements associated with the watercraft and oriented with a second emitting face in a second facing direction, wherein the second facing direction is generally outward of the watercraft and is different than the first facing direction, and wherein the computer program code is further configured to, when executed, cause the one or more processors to:
operate the second array;
receive second sonar return data from the plurality of sonar transducer elements of the second array;
generate a second sonar image of the underwater environment outward from the watercraft, wherein the second sonar image is a second two-dimensional live sonar image that is formed of the second sonar return data, and wherein the second sonar return data used to form the second two-dimensional live sonar image was received at substantially the same time by the plurality of sonar transducer elements of the second array as the plurality of sonar transducer elements of the first array;
determine the second facing direction; and
cause, on the display, presentation of the second sonar image in the second facing direction on the chart and relative to the representation of the watercraft while the first sonar image is presented on the chart.

5. The system of claim 4, wherein the first sonar image defines a first coverage area in the horizontal plane extending outwardly from the watercraft, wherein the second sonar image defines a second coverage area in the horizontal plane extending outwardly from the watercraft, wherein the first coverage area is different from the second coverage area such that the first coverage area does not overlap the second coverage area.

6. The system of claim 5, wherein the computer program code is further configured to, when executed, cause the one or more processors to cause presentation of a plurality of sonar images on the chart to form a 360° sonar image around the representation of the watercraft, wherein the plurality of sonar images includes at least the first sonar image and the second sonar image.

7. The system of claim 1, wherein the sonar image is a first sonar image based on sonar return data received at a first time, wherein the facing direction is a first facing direction, wherein the array of a plurality of sonar transducer elements is rotatable with respect to the watercraft, wherein the system further comprises a direction sensor configured to sense a direction of the array, and wherein the computer program code is further configured to, when executed, cause the one or more processors to:
operate the array to cause the plurality of sonar transducer elements to transmit one or more second sonar beams into the underwater environment in a second facing direction at a second time that is after the first time;
receive second sonar return data from the plurality of sonar transducer elements of the array;
generate a second sonar image of the underwater environment outward from the watercraft, wherein the second sonar image is a two-dimensional live second sonar image that is formed of the second sonar return data;
determine, based on sensor data from the direction sensor, the second facing direction; and
cause, on the display, presentation of the second sonar image in the second facing direction on the chart and relative to the representation of the watercraft.

8. The system of claim 7, wherein the computer program code is further configured to, when executed, cause the one or more processors to cause presentation of the first sonar image to remain on the chart while causing presentation of the second sonar image.

9. The system of claim 8, wherein the computer program code is further configured to, when executed, cause the one or more processors to cause presentation of the first sonar image to fade out over a period of time while causing presentation of the second sonar image.

10. The system of claim 1 further comprising a direction sensor configured to sense a direction of the array, wherein the computer program code is further configured to, when executed, cause the one or more processors to determine the facing direction based on sensor data from the direction sensor.

11. The system of claim 1, wherein the sonar image is presented as an overlay on the chart.

12. The system of claim 1, wherein the computer program code is further configured to, when executed, cause the one or more processors to:
determine an object within the sonar image;
determine a position of the object within the sonar image;
cause, on the display, presentation of an indicator for the object at the position within the sonar image, wherein the indicator highlights or otherwise indicates the object within the sonar image;
determine an updated position of the object within the sonar image as the sonar image is updated based on additional sonar return data being captured; and
cause, on the display, presentation of the indicator at the updated position so as to track the object within the two-dimensional live sonar image.

13. The system of claim 1, wherein the emitting face of the array defines a width and a length, wherein the length of the emitting face is greater than the width of the emitting face, and wherein the length of the emitting face extends in a fore-to-aft direction of the watercraft, wherein each of the plurality of sonar transducer elements defines a length and a width, wherein the length of each of the plurality of sonar transducer elements is greater than the width of each of the plurality of sonar transducer elements, wherein the length of each of the plurality of sonar transducer elements is perpendicular to the length of the emitting face.

14. A method for presenting marine information, the method comprising:
   causing, on a display, presentation of a chart including at least a portion of a body of water;
   causing, on the display, presentation of a representation of a watercraft at a position on the chart corresponding to a current location of the watercraft;
   operating at least one array of a plurality of sonar transducer elements to cause the plurality of sonar transducer elements to transmit one or more sonar beams into an underwater environment of the body of water, wherein the array is associated with the watercraft and oriented with an emitting face in a facing direction, wherein the plurality of sonar transducer elements are configured to operate at a fixed phase shift and vary in frequency so as to beamform multiple sonar return beams based on one or more sonar beams transmitted into the underwater environment;
   receiving sonar return data from the plurality of sonar transducer elements of the at least one array;
   filtering the sonar return data based on frequency to form the multiple sonar return beams that together form a coverage area in a horizontal plane extending outwardly from the watercraft, wherein the coverage area extends a radial distance outwardly from the emitting face;
   generating a sonar image of the underwater environment outward from the watercraft, wherein the sonar image is a two-dimensional live sonar image that is formed of the sonar return data from each of the multiple sonar return beams, and wherein the sonar return data used to form the two-dimensional live sonar image was received at substantially a same time by the plurality of sonar transducer elements, wherein the sonar return data used to form the two-dimensional live sonar image is updated in real-time;
   determining the facing direction; and
   causing, on the display, presentation of the sonar image in the facing direction on the chart and relative to the representation of the watercraft, wherein the sonar image extends outwardly from the representation of the watercraft on the chart a distance dimensionally corresponding to the radial distance of the coverage area to thereby visually indicate a real world coverage area of the two-dimensional live sonar image, wherein the sonar image is presented in the facing direction on the chart so as to visually provide a relationship between objects within the live sonar imagery and a real-world position of the objects.

15. A marine electronic device for presenting marine information, wherein the marine electronic device comprises:
   a display;
   one or more processors; and
   a memory including computer program code configured to, when executed, cause the one or more processors to:
      cause, on the display, presentation of a chart including at least a portion of a body of water;
      cause, on the display, presentation of a representation of a watercraft at a position on the chart corresponding to a current location of the watercraft;
      receive sonar return data from a plurality of sonar transducer elements of an array, wherein the plurality of sonar transducer elements are configured to transmit one or more sonar beams into an underwater environment of the body of water, wherein the array is associated with the watercraft and oriented with an emitting face in a facing direction, wherein the plurality of sonar transducer elements are configured to operate at a fixed phase shift and vary in frequency so as to beamform multiple sonar return beams based on one or more sonar beams transmitted into the underwater environment;
      filter the sonar return data based on frequency to form the multiple sonar return beams that together form a coverage area in a horizontal plane extending outwardly from the watercraft, wherein the coverage area extends a radial distance outwardly from the emitting face;
      generate a sonar image of the underwater environment outward from the watercraft, wherein the sonar image is a two-dimensional live sonar image that is formed of the sonar return data from each of the multiple sonar return beams, and wherein the sonar return data used to form the two-dimensional live sonar image was received at substantially a same time by the plurality of sonar transducer elements, wherein the sonar return data used to form the two-dimensional live sonar image is updated in real-time;
      determine the facing direction; and
      cause, on the display, presentation of the sonar image in the facing direction on the chart and relative to the representation of the watercraft, wherein such that the sonar image extends outwardly from the representation of the watercraft on the chart a distance dimensionally corresponding to the radial distance of the coverage area to thereby visually indicate a real world coverage area of the two-dimensional live sonar image, wherein the sonar image is presented in the facing direction on the chart so as to visually provide a relationship between objects within the live sonar imagery and a real-world position of the objects.

16. The marine electronic device of claim 15, wherein the computer program code is further configured to, when executed, cause the one or more processors to:
   determine a zoom level of the chart being presented on the display; and
   adjust a size of the sonar image based on the zoom level of the chart for presentation of the sonar image on the chart at the zoom level.

17. The marine electronic device of claim 15, wherein the coverage area defines an overall coverage angle within the range of 90° to 140°.

18. The marine electronic device of claim 15, wherein the at least one array is a first array, wherein the sonar image is a first sonar image, wherein the corresponding facing direction of the first array is a first facing direction, and wherein the computer program code is further configured to, when executed, cause the one or more processors to:
   receive second sonar return data from a plurality of sonar transducer elements of a second array, wherein the plurality of sonar transducer elements of the second array are associated with the watercraft and oriented with a second emitting face in a second facing direction, wherein the second facing direction is generally outward of the watercraft and is different than the first facing direction;
generate a second sonar image of the underwater environment outward from the watercraft, wherein the second sonar image is a second two-dimensional live sonar image that is formed of the second sonar return data, and wherein the second sonar return data used to form the second two-dimensional live sonar image was received at substantially the same time by the plurality of sonar transducer elements of the second array as the plurality of sonar transducer elements of the first array;
determine the second facing direction; and
cause, on the display, presentation of the second sonar image in the second facing direction on the chart and relative to the representation of the watercraft while the first sonar image is presented on the chart.

19. The marine electronic device of claim 18, wherein the first sonar image defines a first coverage area in the horizontal plane extending outwardly from the watercraft, wherein the second sonar image defines a second coverage area in the horizontal plane extending outwardly from the watercraft, wherein the first coverage area is different from the second coverage area such that the first coverage area does not overlap the second coverage area.

20. The marine electronic device of claim 19, wherein the computer program code is further configured to, when executed, cause the one or more processors to cause presentation of a plurality of sonar images on the chart to form a 360° sonar image around the representation of the watercraft, wherein the plurality of sonar images includes at least the first sonar image and the second sonar image.

* * * * *

UNITED STATES PATENT AND TRADEMARK OFFICE
CERTIFICATE OF CORRECTION

| | | |
|---|---|---|
| PATENT NO. | : 11,703,560 B2 | Page 1 of 1 |
| APPLICATION NO. | : 17/965135 | |
| DATED | : July 18, 2023 | |
| INVENTOR(S) | : Jeremiah D. Clark | |

It is certified that error appears in the above-identified patent and that said Letters Patent is hereby corrected as shown below:

In the Claims

In Claim 15, Column 30, Line 36, should read:
-- representation of the watercraft, wherein --
Instead of:
"representation of the watercraft, wherein such that".

Signed and Sealed this
Twenty-second Day of August, 2023

Katherine Kelly Vidal
*Director of the United States Patent and Trademark Office*